(12) United States Patent
Okiyama et al.

(10) Patent No.: US 11,196,929 B2
(45) Date of Patent: Dec. 7, 2021

(54) SIGNAL PROCESSING DEVICE, IMAGING DEVICE, AND SIGNAL PROCESSING METHOD

(71) Applicants: SONY CORPORATION, Tokyo (JP); SONY SEMICONDUCTOR SOLUTIONS CORPORATION, Kanagawa (JP)

(72) Inventors: Norimitsu Okiyama, Kanagawa (JP); Hiroshi Arai, Kanagawa (JP); Yumi Nagaoka, Kanagawa (JP); Hiroaki Takahashi, Tokyo (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 17/250,608

(22) PCT Filed: Jun. 28, 2019

(86) PCT No.: PCT/JP2019/025865
§ 371 (c)(1),
(2) Date: Feb. 10, 2021

(87) PCT Pub. No.: WO2020/039747
PCT Pub. Date: Feb. 27, 2020

(65) Prior Publication Data
US 2021/0314473 A1     Oct. 7, 2021

(30) Foreign Application Priority Data
Aug. 20, 2018  (JP) .............................. JP2018-153873

(51) Int. Cl.
*H04N 5/232*           (2006.01)

(52) U.S. Cl.
CPC ....... *H04N 5/2329* (2013.01); *H04N 5/23254* (2013.01); *H04N 5/23258* (2013.01)

(58) Field of Classification Search
CPC ............. H04N 5/2329; H04N 5/23254; H04N 5/23258; H04N 5/23274; H04N 5/23267;
(Continued)

(56) References Cited

U.S. PATENT DOCUMENTS 9,071,756 B2 *  6/2015  Karpenko ............ H04N 5/2329
9,269,131 B2 *  2/2016  Tsubaki .................. G06T 5/006
(Continued)

FOREIGN PATENT DOCUMENTS

CN   104247395 A   12/2014
CN   104982027 A   10/2015
(Continued)

OTHER PUBLICATIONS

International Search Report and Written Opinion of PCT Application No. PCT/JP2019/025865, dated Sep. 3, 2019, 08 pages of ISRWO.

*Primary Examiner* — Pritham D Prabhakher
(74) *Attorney, Agent, or Firm* — Chip Law Group

(57) ABSTRACT

Posture information corresponding to a line of an input image is calculated. Then, a first virtual line, which is a line in a line direction of the input image for which the posture information calculated is common, is rotated according to the posture information to obtain a second virtual line on the output image. For each pixel of the output image, a corresponding second virtual line is calculated, and posture information is obtained on the basis of the corresponding second virtual line. Then, for coordinates of each pixel of the output image, the reference coordinates on the input image corresponding to the pixel coordinates is calculated using the associated posture information. By cutting out the output (Continued)

image from the input image on the basis of the reference pixel, highly accurate distortion correction can be realized even in a case where the camera posture differs depending on the line.

15 Claims, 17 Drawing Sheets

(58) Field of Classification Search
CPC ........ H04N 5/23248; H04N 5/77; H04N 5/91; G06T 3/0093; G06T 3/0056; G06T 3/40; G06T 5/009; G11B 27/11
USPC .................................................... 348/208.6
See application file for complete search history.

(56) References Cited

U.S. PATENT DOCUMENTS

| | | | | |
|---|---|---|---|---|
| 9,639,913 | B2* | 5/2017 | Satoh | H04N 5/23248 |
| 10,027,893 | B2* | 7/2018 | Bell | H04N 5/23274 |
| 10,462,370 | B2* | 10/2019 | Shi | G06T 5/50 |
| 10,498,962 | B2* | 12/2019 | Iso | H04N 5/23229 |
| 10,572,982 | B2* | 2/2020 | Beric | H04N 5/3572 |
| 10,848,676 | B2* | 11/2020 | Murashima | H04N 5/23287 |
| 2014/0160309 | A1 | 6/2014 | Karpenko | |
| 2014/0161357 | A1* | 6/2014 | Tsubaki | G06T 5/006 382/197 |
| 2015/0123990 | A1 | 5/2015 | Satoh | |
| 2015/0262344 | A1* | 9/2015 | Stec | G06T 5/006 382/275 |
| 2017/0332018 | A1 | 11/2017 | Bell et al. | |
| 2018/0213153 | A1* | 7/2018 | Iso | H04N 5/23267 |
| 2019/0102868 | A1* | 4/2019 | Beric | G06T 3/0018 |
| 2019/0104255 | A1* | 4/2019 | Shi | H04N 5/23287 |
| 2019/0191090 | A1* | 6/2019 | Murashima | G02B 27/646 |
| 2020/0137308 | A1* | 4/2020 | Kulik | H04N 5/23287 |

FOREIGN PATENT DOCUMENTS

| | | |
|---|---|---|
| EP | 2744192 A2 | 6/2014 |
| EP | 2849428 A1 | 3/2015 |
| JP | 2008-028500 A | 2/2008 |
| JP | 2016-197929 A | 11/2016 |
| JP | 2016-220083 A | 12/2016 |
| JP | 2018-085775 A | 5/2018 |
| KR | 10-2014-0138947 A | 12/2014 |
| KR | 10-2015-0095782 A | 8/2015 |
| WO | 2014/069632 A1 | 5/2014 |
| WO | 2014/156731 A1 | 10/2014 |

* cited by examiner

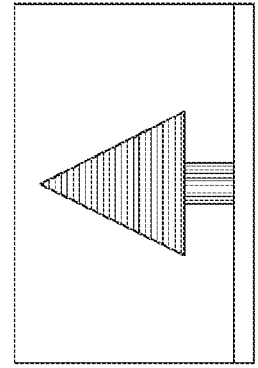
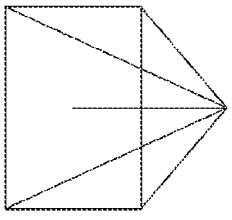
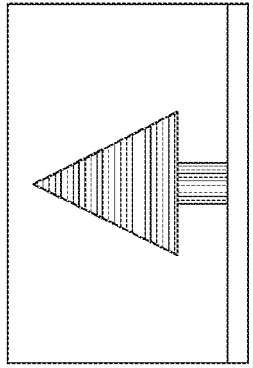
FIG. 2A
IMAGING BY TILTED CAMERA
FIG. 2D
STRAIGHT CAMERA
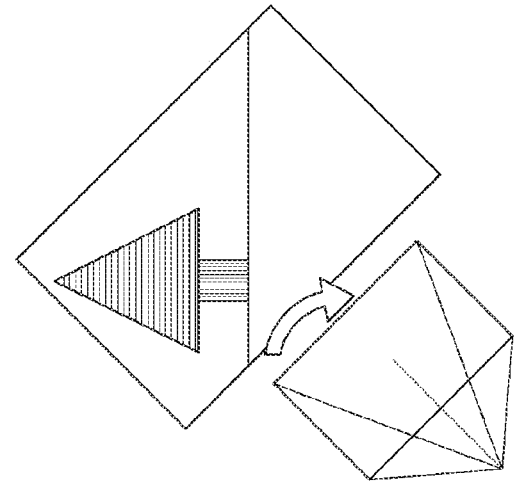
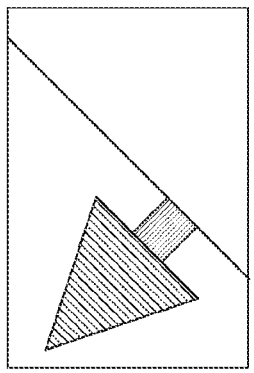
FIG. 2B
CAPTURED IMAGE
FIG. 2C
IMAGE PROCESSED BY EIS
ROTATE IN SAME DIRECTION AS TILT OF CAMERA

CORRESPONDENCE BETWEEN
INPUT IMAGE AND IMU SAMPLE
(CAMERA POSTURE)

CORRESPONDENCE BETWEEN
OUTPUT IMAGE AND IMU SAMPLE

NEAR TWO-SAMPLE SEARCH RESULT

INPUT IMAGE AND IMU SAMPLE

NEAR TWO-SAMPLE SEARCH RESULT

SIGNAL PROCESSING DEVICE, IMAGING DEVICE, AND SIGNAL PROCESSING METHOD

CROSS REFERENCE TO RELATED APPLICATIONS

This application is a U.S. National Phase of International Patent Application No. PCT/JP2019/025865 filed on Jun. 28, 2019, which claims priority benefit of Japanese Patent Application No. JP 2018-153873 filed in the Japan Patent Office on Aug. 20, 2018. Each of the above-referenced applications is hereby incorporated herein by reference in its entirety.

TECHNICAL FIELD

The present technology relates to a signal processing device, an imaging device, and a signal processing method, and particularly to a technology for correcting rolling shutter distortion of an imaging device (camera).

BACKGROUND ART

Optical image stabilizer (OIS) and electronic image stabilization (EIS) are known as image stabilization for an imaging device (camera), and these can be used to suppress the effect given by shake of an imaging device to an image.

For example, in electronic image stabilization, image processing is performed so as to correct camera shake by a method of obtaining the movement amount from an image. However, in this method, the calculation process is complicated, the accuracy of measuring the movement amount in low light is lowered, and the estimation error of the amount of camera shake by a moving subject occurs, so that the accuracy of image stabilization is lowered in some cases.

On the other hand, electronic image stabilization using motion sensor information detected by a gyro sensor, an acceleration sensor, or the like has been proposed.

However, in conventional electronic image stabilization using motion sensor information, the position of the entire image is only moved according to the movement amount, and it is difficult to deal with a difference in the movement amount depending on the position in an image plane.

In particular, in a case where an imaging element using a rolling shutter such as a complementary metal oxide semiconductor (CMOS) image sensor is used, the difference in the movement amount within one screen due to the deviation of the exposure time for each pixel line (focal plane phenomenon) has not been dealt with.

Therefore, as disclosed in Patent Document 1, the applicant proposes an imaging device capable of performing image stabilization correspondingly to a difference in a movement amount due to a position in an image plane, and a difference in a movement amount due to deviation of exposure time in one screen. By adopting this image stabilization, it is possible to perform image stabilization from the center to the periphery with great accuracy, and it is also possible to suppress deformation due to the focal plane phenomenon.

CITATION LIST

Patent Document

Patent Document 1: International Publication No. 2014/156731 Pamphlet

SUMMARY OF THE INVENTION

Problems to be Solved by the Invention

As described above, a preferable effect can be obtained by image stabilization disclosed in Patent Document 1, but especially for an image captured by the rolling shutter method, there is a demand for more appropriate correction of deformation due to the focal plane phenomenon (rolling shutter distortion).

An object of the present disclosure is to enable more accurate distortion correction to be realized in view of such a situation.

Solutions to Problems

A signal processing device according to the present technology includes: a posture calculation unit that calculates posture information corresponding to a line of an input image; a posture association unit that rotates a first virtual line, which is a virtual line in a line direction of the input image for which the posture information calculated is common, according to the posture information to obtain a second virtual line, which is a virtual line on an output image to calculate a corresponding second virtual line corresponding to each pixel of the output image to obtain posture information on the basis of the corresponding second virtual line; and an image deformation unit that uses the posture information associated by the posture association unit to calculate, for coordinates of each pixel of the output image, reference coordinates on the input image corresponding to the pixel coordinates.

Such a signal processing device can be applied to distortion correction of an image captured by the rolling shutter method. That is, the posture information of the camera in the image captured by the rolling shutter method differs depending on the line when the camera posture changes. In a case where the change in camera posture is large, if the posture information of the line as the first virtual line is used for the output image cut out by coordinate conversion, it is not always possible to obtain appropriate posture information for each pixel. Therefore, the second virtual line is calculated so that the posture information corresponding to the pixel of the output image is obtained.

Note that the first virtual line is a line corresponding to the posture information obtained from the data (for example, IMU sample) detected for each line of the captured image of one frame or for each intermittent line, and is, for example, a straight line corresponding to the line of the input image. It can be said that there is a plurality of first virtual lines in one frame. The pixels of the line corresponding to one first virtual line are pixels having the same value of posture information.

The second virtual line is, for example, a line obtained by converting the coordinates of the first virtual line, and is assumed to be, for example, a straight line, a polygonal line, or a curved line.

It is conceivable that, the signal processing device according to the present technology described above includes a reference pixel acquisition unit that reads reference pixel data from a storage unit that stores pixel data of the input image on the basis of the reference coordinates for coordinates of each pixel of the output image, and an interpolation unit that performs interpolation processing using the reference pixel data to generate pixel data included in the output image.

That is, in order to obtain each pixel of the output image, the pixel data of the input image is acquired on the basis of the reference coordinates obtained for each pixel, and the interpolation processing is performed.

It is conceivable that, in the signal processing device according to the present technology described above, the second virtual line is a plurality of lines to which rotation of a rotation angle indicated by the respective pieces of posture information is given for the plurality of the first virtual lines.

That is, the second virtual line is two-dimensionally expressed line with an inclination on the output image by giving each line of the first virtual line of the input image a rotation angle corresponding to each piece of posture information on the output image.

It is conceivable that, in the signal processing device according to the present technology described above, the posture association unit obtains two second virtual lines having a relationship in which the pixel coordinates are sandwiched as the corresponding second virtual line for pixel coordinates of the output image, and obtains the posture information of the pixel coordinates by processing using the two second virtual lines.

The second virtual line is a line that is two-dimensionally expressed by projecting the line of the input image on the output image, and since the rotation angle changes for each line, lattice points (pixel coordinates) are not always match in the input image and the output image. Therefore, the posture information is obtained using the two second virtual lines that sandwich the pixel coordinates.

It is conceivable that, in the signal processing device according to the present technology described above, the posture association unit uses an outer product of a vector on the second virtual line and a vector extending from the second virtual line to the pixel coordinates to be processed to determine two second virtual lines that serve as the second virtual lines corresponding to the pixel coordinates, for each of the plurality of second virtual lines.

That is, the two second virtual lines that sandwich the coordinates of the pixel of interest are determined using the outer product of the vectors.

It is conceivable that, in the signal processing device according to the present technology described above, the posture association unit performs linear interpolation by the inverse ratio of a distance of a perpendicular line from the pixel coordinates of the processing target to the corresponding two second virtual lines to obtain the posture information of the pixel coordinates.

The two second virtual lines that sandwich the coordinates of the pixel of interest are the lines that indicate the posture information. Using each piece of posture information, interpolation is performed according to the ratio of the distances of the two second virtual lines from the pixel coordinates of the processing target.

It is conceivable that, in the signal processing device according to the present technology described above, the posture information is a rotation vector representing the tilt of the imaging device by a three-dimensional vector.

The rotation vector represents the rotation axis by the direction of the vector, and represents the rotation amount (unit: radian) by the size of the vector.

It is conceivable that, in the signal processing device according to the present technology described above includes an output image coordinate generation unit that sequentially instructs the posture association unit and the image deformation unit on the coordinates of each pixel of the output image to be processed.

For example, each pixel sequentially becomes a processing target in the posture association unit and the image deformation unit in raster order or the like by a counter that sequentially specifies each pixel of the image in the horizontal direction and the vertical direction.

It is conceivable that, in the signal processing device according to the present technology described above, the posture association unit and the image deformation unit calculate the pixel coordinates of the input image that is referred to for generation of a pixel value of pixel coordinates of the output image, by operation for a coordinate point, to use the pixel coordinates as the reference coordinates.

That is, the image data (each pixel data) is not used, but the operation for obtaining the correspondence between the coordinates is performed.

It is conceivable that the signal processing device according to the present technology described above includes a storage unit that stores the pixel data of the input image.

The input image that has been captured and input is subjected to necessary processing such as block conversion and stored in the storage unit.

It is conceivable that, in the signal processing device according to the present technology described above, the reference coordinates are used as reference coordinates for realizing the posture correction and the lens distortion correction of the input image in the output image.

Since the input image that has been captured and input is a signal of the subject light incident on the imager through the lens, it is affected by the lens distortion. Therefore, when the image (coordinates) is rotated, first, the influence of the lens distortion of the input image is removed.

It is conceivable that, in the signal processing device according to the present technology described above, the input image is a captured image signal associated with posture detection data.

The captured image signal captured by the imaging device (camera) is used as the input image, and the posture detection data of the camera, for example, an IMU sample, is associated with the captured image signal.

It is conceivable that, in the signal processing device according to the present technology described above, the posture detection data is angular velocity data and acceleration data.

That is, the IMU sample is associated with the captured image signal.

An imaging device according to the present technology includes: an imaging unit that receives subject light incident via an optical system to image the subject; a detection unit that obtains posture detection data at the time of imaging of the imaging unit; and a posture calculation unit, a posture association unit, an image deformation unit, a reference pixel acquisition unit, and an interpolation unit, as the signal processing device described above.

As a result, a signal processing device that performs appropriate distortion correction is installed in the imaging device.

A signal processing method according to the present technology includes, by a signal processing device, posture calculation processing of calculating posture information corresponding to a line of input image, posture association processing of rotating a first virtual line, which is a virtual line in a line direction of the input image with common calculated posture information, according to the posture information to obtain a second virtual line, which is a virtual line on an output image to calculate a corresponding second virtual line corresponding to each pixel of the output image to calculate the second virtual line corresponding to each pixel of the output image to obtain posture information on the basis of the corresponding second virtual line, and conversion processing of using the posture information associated by the posture association processing to calculate reference coordinates on the input image corresponding to the pixel coordinates.

As a result, with respect to the image captured by the rolling shutter method, the posture information corresponding to the pixels of the output image can be appropriately obtained even in a case where the camera posture change is large.

Effects of the Invention

According to the present technology, it is possible to associate appropriate camera posture information to each pixel position of the output image, and distortion correction can be performed with high accuracy even if the posture change is large.

Note that the effects described herein are not necessarily limited, and any of the effects described in the present disclosure may be applied.

BRIEF DESCRIPTION OF DRAWINGS

FIGS. 2A, 2B, 2C, and 2D are explanatory diagrams of EIS processing.

MODE FOR CARRYING OUT THE INVENTION

Hereinafter, embodiments will be described in the following order.

<1. Configuration of signal processing device of first embodiment>
<2. Operation of signal processing device>
<3. Camera posture association processing>
<4. Configuration of signal processing device of second embodiment>
<5. Summary and modification>
<1. Configuration and Operation Outline of Signal Processing Device of First Embodiment>

Figure 1:
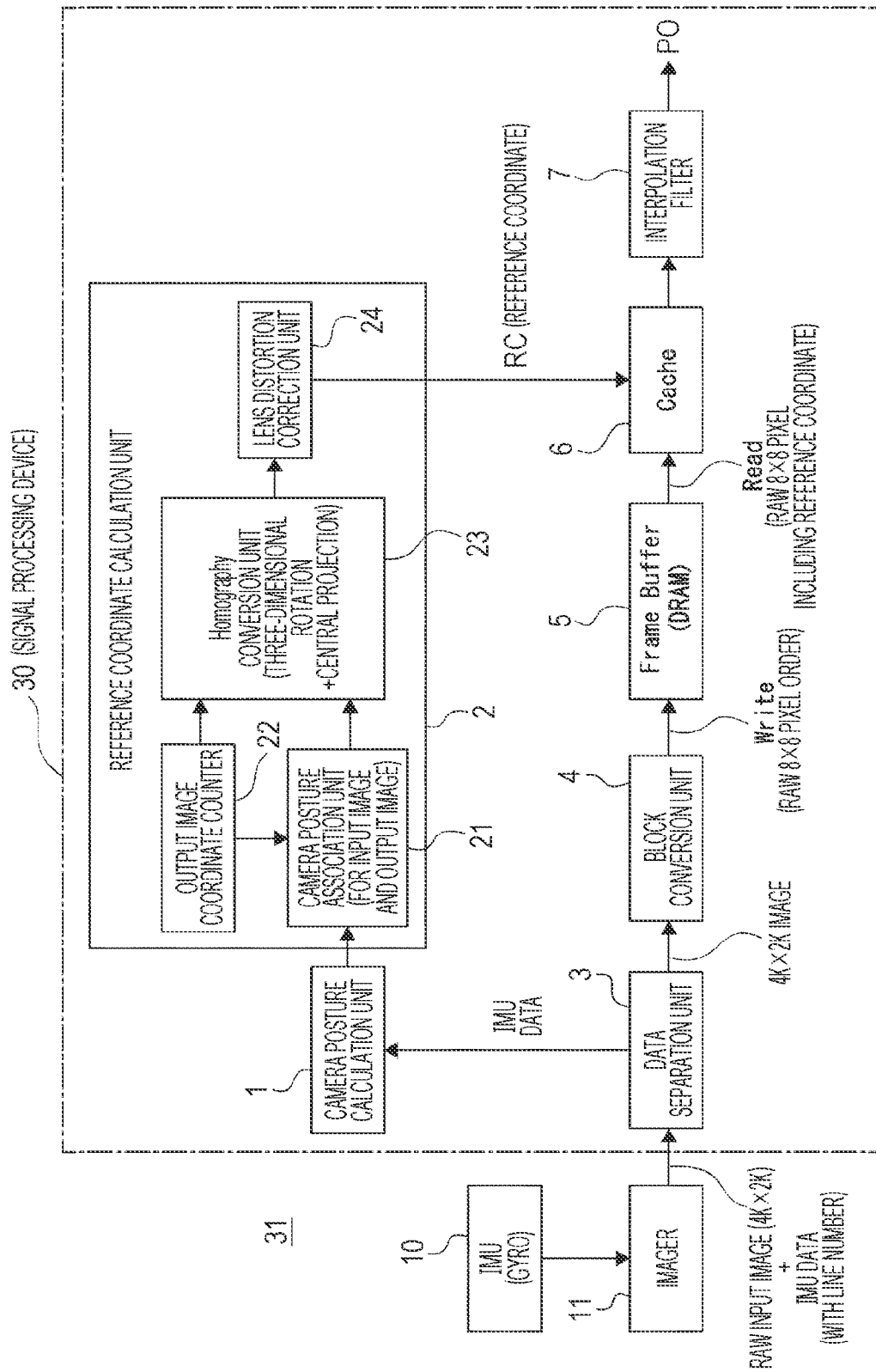
FIG. 1 is a block diagram of a signal processing device according to a first embodiment of the present technology.

FIG. 1 shows a configuration example of a signal processing device 30 of a first embodiment.

FIG. 1 shows a part of the configuration of an imaging device 31, and the signal processing device 30 is built in the imaging device 31 as an example.

The imaging device 31 includes an inertial measurement unit (IMU) 10, an imager 11, and the signal processing device 30.

The IMU 10 is a device that detects angular velocity and acceleration in three axial directions, and is installed here as a unit that detects the camera posture. The posture detection data (for example, IMU data of angular velocity and acceleration) by the IMU 10 is supplied to the imager 11 at predetermined sample timings.

Note that, in addition to the IMU, various motion sensors are assumed to acquire the posture detection data. Furthermore, as the axial direction of posture detection, one capable of detecting movement in the 6-axis or 9-axis direction may be used.

The imager 11 includes an imaging element unit and an imaging signal processing unit. The imaging element unit in the imager 11 has an imaging surface in which a plurality of pixels is arranged in a matrix. Then, the imaging element unit captures an image of a subject that is imaged on the imaging surface by condensing light from the subject by an optical system (not shown), and outputs an image signal acquired by the imaging.

The obtained image signal is subjected to processing such as automatic gain control (AGC) processing and analog-digital conversion (A/D conversion) in the imaging signal processing unit in the imager 11, and is output from the imager 11 as RAW image data, for example. For example, the RAW image data is output as image data with 4K×2K pixels.

Furthermore, the imager 11 is equipped with an interface for the IMU 10, and IMU data output from the IMU 10 is imported via that interface. Then, the imager 11 associates the RAW image data with the IMU data and outputs the data.

In this case, the IMU data indicates the corresponding line number. Since the imaging element unit of the imager 11 uses the rolling shutter method for imaging, the exposure timing differs for each line. On the other hand, the IMU 10 outputs IMU data at predetermined sample timings. For example, the timing relationship is such that one frame of the captured image includes a plurality of sample timings.

Therefore, the IMU data of one sample timing is the data detected at the exposure timing of a certain line in the image of one frame. Then, the line number is associated with the IMU data so that the IMU data and the line of the image can be synchronized.

The signal processing device 30 includes a camera posture calculation unit 1, a reference coordinate calculation unit 2, a data separation unit 3, a block conversion unit 4, a frame buffer 5, a cache 6, and an interpolation filter 7.

Furthermore, the reference coordinate calculation unit 2 includes a camera posture association unit 21, an output image coordinate counter 22, a homography conversion unit 23, and a lens distortion correction unit 24.

The data separation unit 3 separates the RAW image data with IMU data supplied from the imager 11 into image data and IMU data. Then, the data separation unit 3 supplies the IMU data to the camera posture calculation unit 1 and supplies the RAW image data (input image) to the block conversion unit 4.

The block conversion unit 4 performs block conversion in which 4K×2K image data is arranged in the order of 8×8 pixels.

The block-converted image data is written to the frame buffer 5 in the order of 8×8 pixels of the RAW image data. The frame buffer 5 includes, for example, a dynamic random access memory (DRAM).

RAW image data of 8×8 pixels is read out from the frame buffer 5 on the basis of reference coordinates RC as described later, and is held in the cache 6.

The RAW image data read into the cache 6 is interpolated by the interpolation filter 7 (for example, a Lanczos filter), and the RAW image data as an output image PO is output.

Note that, although not shown, circuits such as a development processing system and a recording system are provided in the subsequent stage of the signal processing device 30, and the output image PO is subjected to development processing, compression processing, and the like, and is used for display, stored in a storage medium, or transmitted to an external device.

Here, the RAW image data as the output image PO via the interpolation filter 7 is image data that has been corrected for the rolling shutter distortion as well as the image stabilization as the EIS and the lens distortion correction. The processing of generating the reference coordinates RC for these corrections is performed by the camera posture calculation unit 1 and the reference coordinate calculation unit 2.

The camera posture calculation unit 1 obtains a rotation vector to be used as posture information in the present embodiment on the basis of the IMU data. The rotation vector will be described later.

The rotation vector is supplied to the camera posture association unit 21 of the signal processing device 30.

In the signal processing device 30, the camera posture association unit 21 associates the corresponding posture information (rotation vector) with each pixel coordinate of the output image.

Furthermore, the homography conversion unit 23 performs processing (image deformation processing) of calculating, for coordinates of each pixel of the output image PO, the reference coordinates on the input image corresponding to the pixel coordinates by using the posture information associated in the camera posture association unit 21.

The output image coordinate counter 22 is a counter that specifies pixels arranged in the horizontal direction and the vertical direction. The output image coordinate counter 22 sequentially gives an instruction on coordinates of each pixel of the output image to be processed by supplying the count values in the horizontal direction and the vertical direction to the camera posture association unit 21 and the homography conversion unit 23.

The lens distortion correction unit 24 further performs correction processing corresponding to lens distortion correction for the reference coordinates on the input image corresponding to coordinates of each pixel of the output image PO.

The reference coordinates obtained as a result of the above are supplied to the cache 6, and the output image PO is generated.

In this configuration, although details will be described later, the camera posture association unit 21 performs processing of rotating the first virtual line, which is a virtual line in the line direction of the input image in which the calculated posture information is common, according to the posture information to obtain the second virtual line which is a virtual line on the output image, and calculating the corresponding second virtual line for each pixel of the output image, and obtaining the posture information on the basis of the corresponding second virtual line. As a result, the rolling shutter distortion can be corrected with high accuracy in the process of the EIS processing.

<2. Operation of Signal Processing Device>

The operation by such a signal processing device 30 will be described.

First, the EIS will be schematically described with reference to FIGS. 2A 2B, 2C, and 2D. In the EIS, processing of removing the influence of the camera tilt and movement from the captured image is performed.

For example, FIG. 2A shows a situation in which an image captured with a tilted camera. The tilted state here is a state in which the camera is tilted in the roll direction and the horizontal and vertical directions are not maintained. In this case, the image data obtained by imaging is in a state in which the subject is tilted as shown in FIG. 2B.

For such image data, by rotating the image in the same direction as the tilt of the camera by the EIS processing, the image data shown in FIG. 2C can be obtained. The image data in FIG. 2C is similar to the image captured by a camera in a straight posture (a posture in which there is no tilt in the roll direction) as shown in FIG. 2D.

The rotation with respect to the tilt of the posture is performed as described above, and this is realized by rotating the pixel range to be cut out on the basis of the posture information when cutting out an output image having a size smaller than the input image size from the input image.

Figure 3:
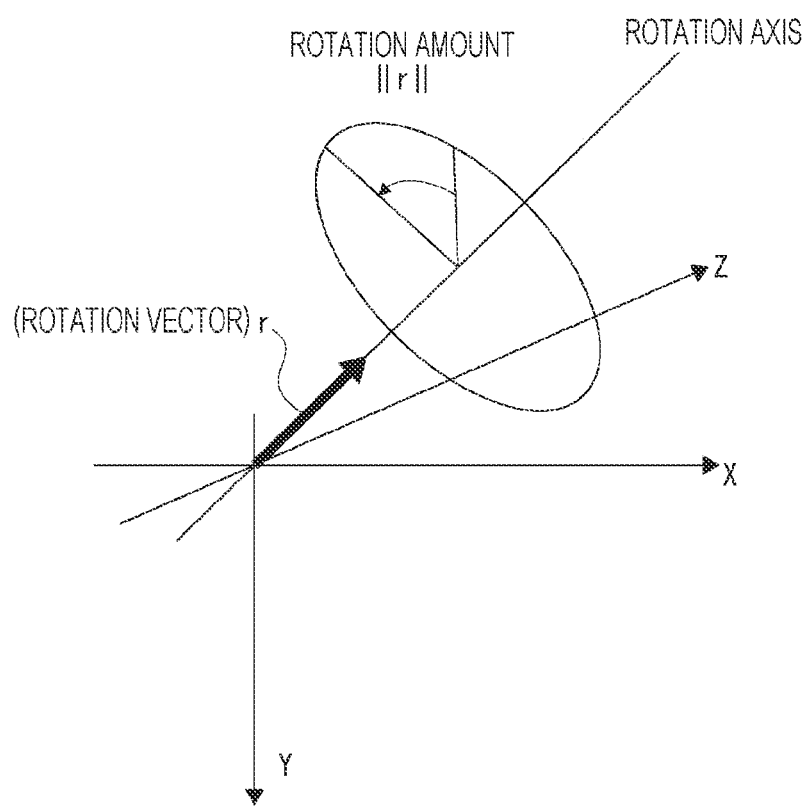
FIG. 3 is an explanatory diagram of a rotation vector of the embodiment.

Here, the rotation vector as the posture information will be described with reference to FIG. 3.

The rotation vector expresses the camera posture as a three-dimensional vector.

That is, the rotation vector is a vector representing the tilt (rotation) of the camera.

The rotation vector represents the rotation axis by the direction of the vector, and represents the rotation amount r (unit: radian) by the size of the vector.

The positive and negative of rotation is positive in the counterclockwise direction when viewed from the tip of the rotation vector.

In order to guarantee uniqueness, the rotation amount (the magnitude of the vector) is limited by, for example, $0 \leq \|r\| \leq 2\pi$.

Figure 4:
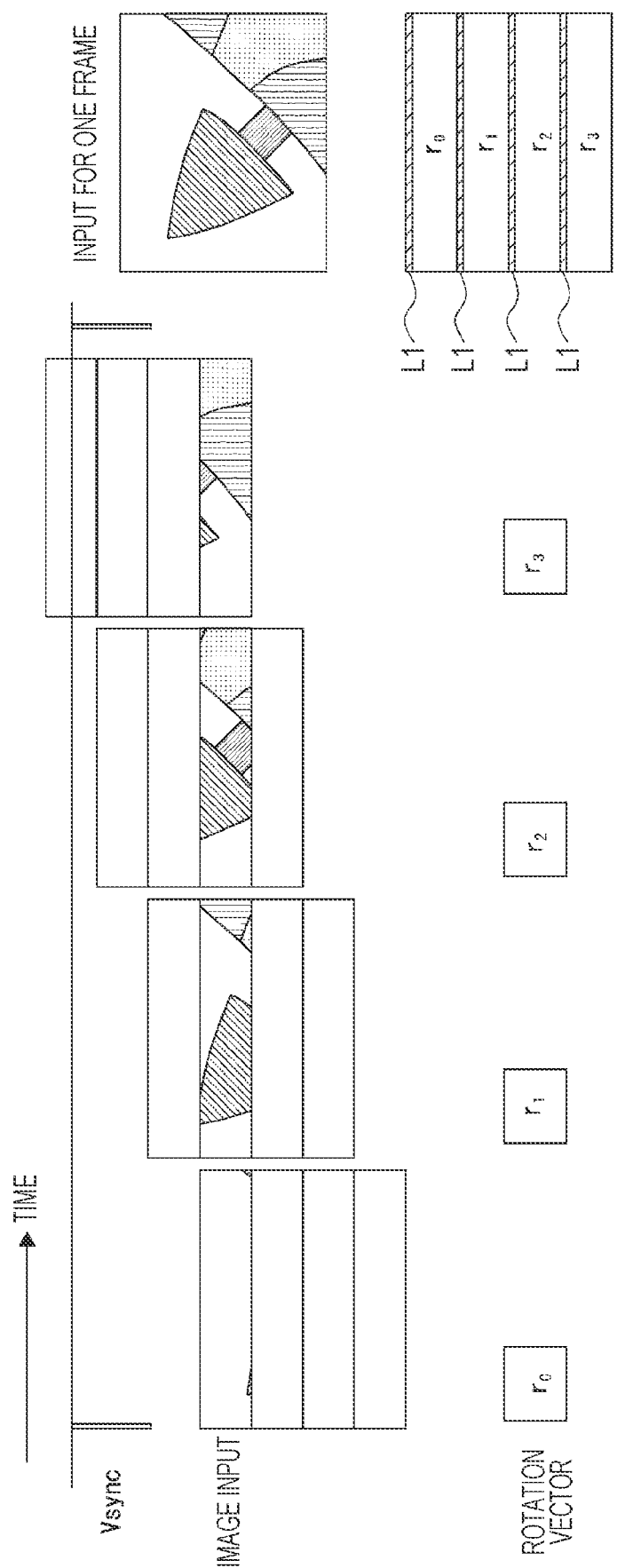
FIG. 4 is an explanatory diagram of a relationship between a rotation vector and an image input according to the embodiment.

FIG. 4 shows the relationship between the rotation vector input and the image input.

When capturing while moving the camera, the rotation vector changes even in one frame.

Assuming that the IMU data that is the basis of the rotation vector is acquired every few lines, for example, the rotation vectors r0, r1, r2, and r3 are also acquired every few lines as shown in the drawing. Here, it is shown that four rotation vectors are acquired in the period of one frame indicated by a vertical synchronization signal Vsync, but this is just an example for explanation. In this case, the rotation vector r0 corresponds to the image in the upper ¼ of the frame, the rotation vector r1 corresponds to the next ¼ image, the rotation vector r2 corresponds to the next ¼ image, and the rotation vector r3 corresponds to the last ¼ image.

Here, the first virtual line L1 indicates a virtual line to which rotation vectors of the same value correspond.

Figure 5:
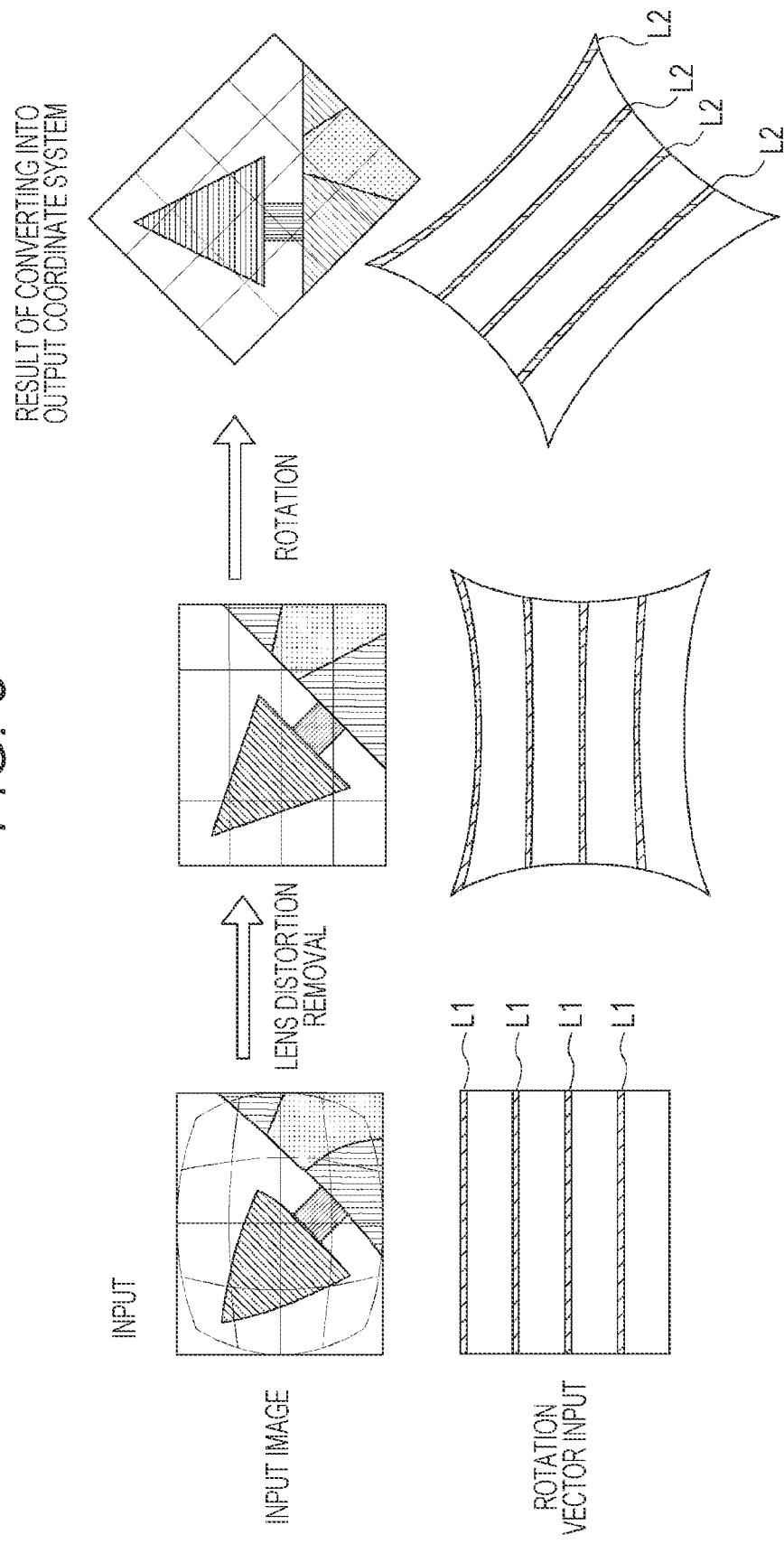
FIG. 5 is an explanatory diagram of lens distortion correction and rotation of the embodiment.

The reference coordinate calculation unit 2 converts the position of the rotation vector corresponding to such an input image into the output coordinates. It can be said that this converts the first virtual line L1 indicating the rotation vector in the input image into the second virtual line L2 in the output coordinate system as shown in FIG. 5.

To convert the position of the rotation vector to the output image, it is necessary to apply the same conversion as the input image. Therefore, as shown in FIG. 5, the lens distortion is first removed from the input image, and then it is rotated in the same direction as the camera. Obtained is the result that has been converted into the output coordinate system.

Figure 6:
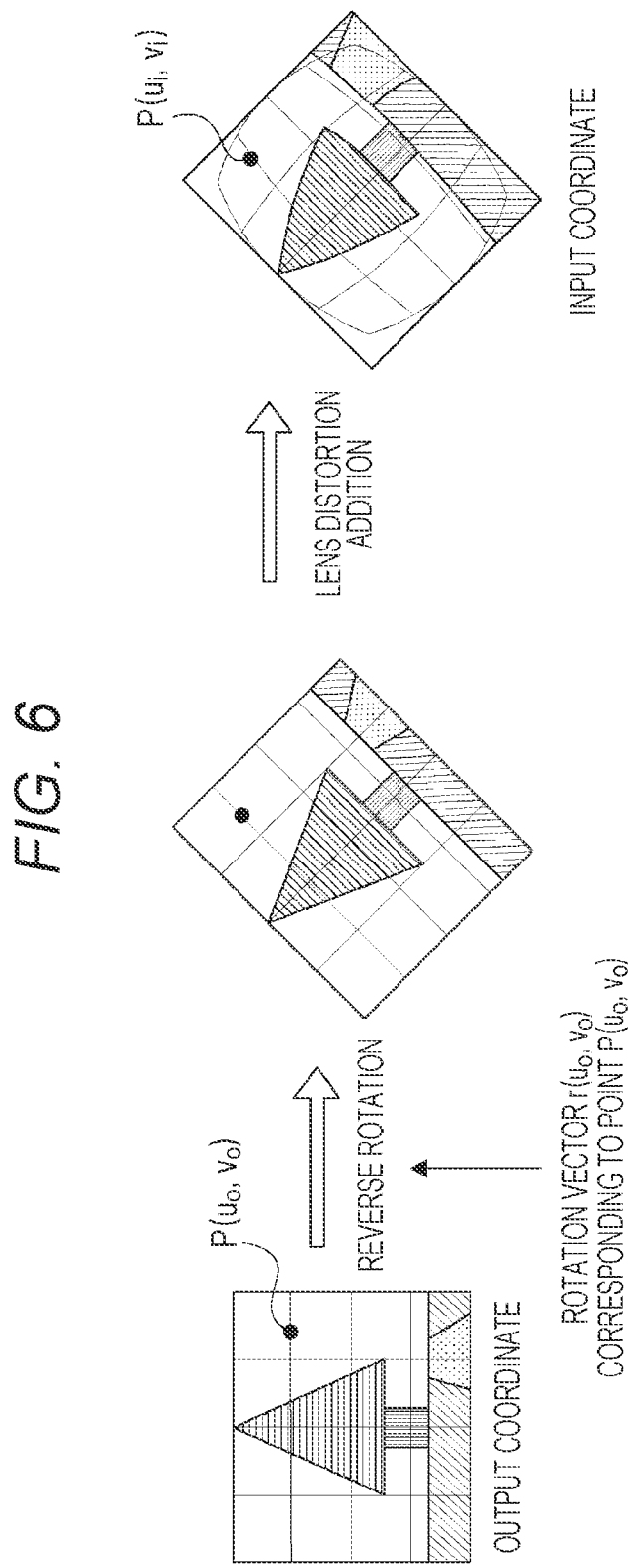
FIG. 6 is an explanatory diagram of coordinate calculation of an input image corresponding to an output image of the embodiment.

Subsequently, as shown in FIG. 6, for each point P (uo, vo) of the output image, a point P (ui, vi) of the corresponding input image is obtained.

That is, for the point of each pixel of the output image, the portion in the input image to which reference is made is obtained.

The output coordinates in FIG. 6 indicate the point P (uo, vo) of a certain pixel of interest, which is pixel coordinates as the output image PO. The point P (ui, vi) of the input image corresponding to the point P (uo, vo) is rotated in the reverse direction using the rotation vector r (uo, vo) corresponding to the point P (uo, vo).

At this time, the rotation vector r (uo, vo) corresponding to the point P (uo, vo) is calculated using the above-mentioned second virtual line L2, so that it is possible to correctly determine a corresponding rotation vector among the values of the rotation vector changing in the frame. That is, the correct rotation vector r can be determined for the point P (uo, vo), and the correct rotation amount can be given as the reverse rotation.

Then, after the reverse rotation, the point P (ui, vi), which is the corresponding point on the input coordinates, can be found by adding the lens distortion so as to be the same as the input image.

For all the pixel coordinates on the output coordinates, the range to be cut out is set by obtaining the points on the corresponding input coordinates as described above.

That is, by obtaining the position on the input image as the reference coordinates for the coordinates of all the pixels of the output image, the pixel range to be cut out from the input image can be obtained for the rotation correction as the EIS.

This specifies the pixel data to be read from the frame buffer 5 to the cache 6, that is, it specifies the range of the input image to be cut out as the output image by adding the correction in the rotation direction.

The reference coordinates are the coordinates of the input image for each pixel of the output image, but since the coordinate points of the output image do not necessarily correspond to the coordinate points as the pixels of the input image, the reference coordinates are the coordinate values including the decimal point.

Note that the reason why the lens distortion is taken into consideration in FIGS. 5 and 6 is that the subject light enters the imaging element unit through the lens of the camera, and the image data as the input image is affected by the lens distortion.

Therefore, when rotating in EIS, the influence of lens distortion of the input image is first removed.

Then, in a case of the present embodiment, by using the virtual second virtual line L2 in obtaining the corresponding point on the input coordinates corresponding to the output coordinates, the corresponding point calculation with high accuracy is performed with respect to the change of the rotation vector in the direction perpendicular to the line. As a result, rolling shutter distortion is also corrected with high accuracy.

In the following, the reason for performing the above operation in the embodiment will be described, and the operation will be described in detail.

Figure 7:
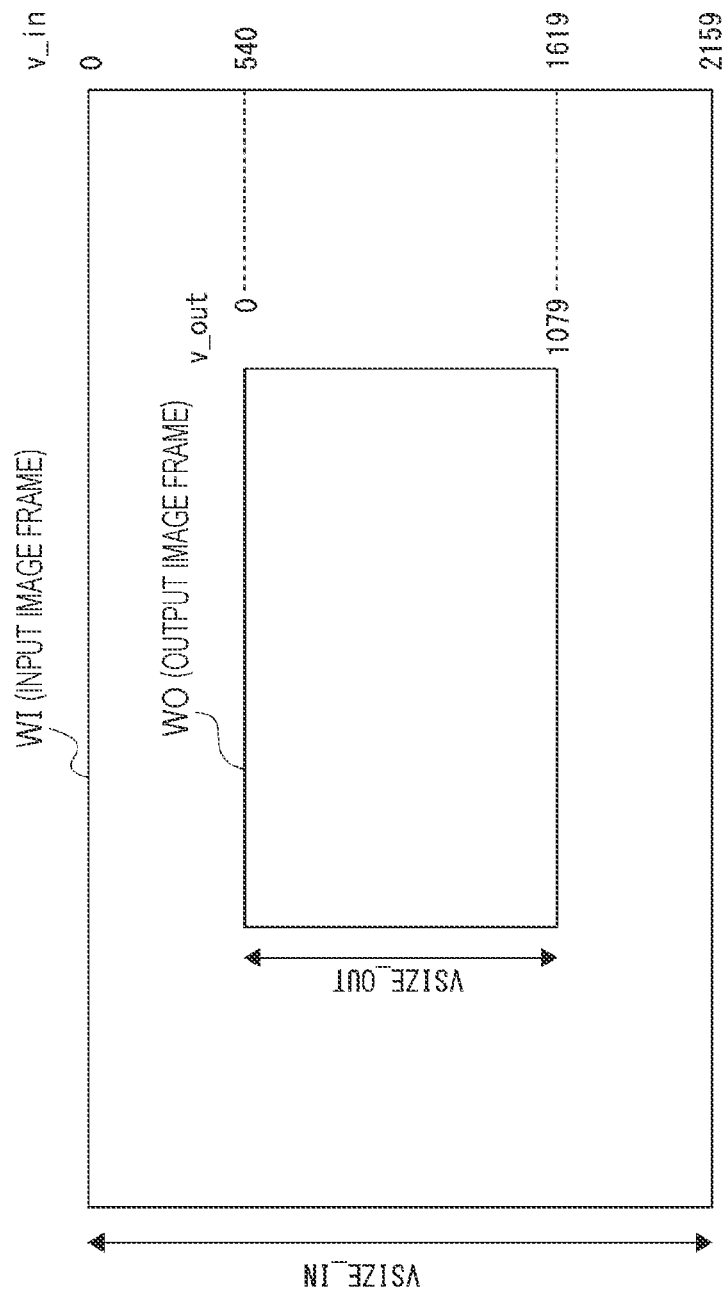
FIG. 7 is an explanatory diagram of an input image frame and an output image frame in EIS processing.

First, FIG. 7 shows an input image frame WI and an output image frame WO. This is an example in which the output image has half the number of pixels of the input image in the horizontal and vertical directions.

Focusing on the line number here, the line number v_in is the line number corresponding to the posture of the input image.

The line number v_out is the line number corresponding to the posture of the output image.

Then, v_out=v_in−(VSIZE_IN−VSIZE_OUT)/2.

In the output image, the posture information in the range of 0 v_out (VSIZE_OUT−1) is used.

Figure 8:
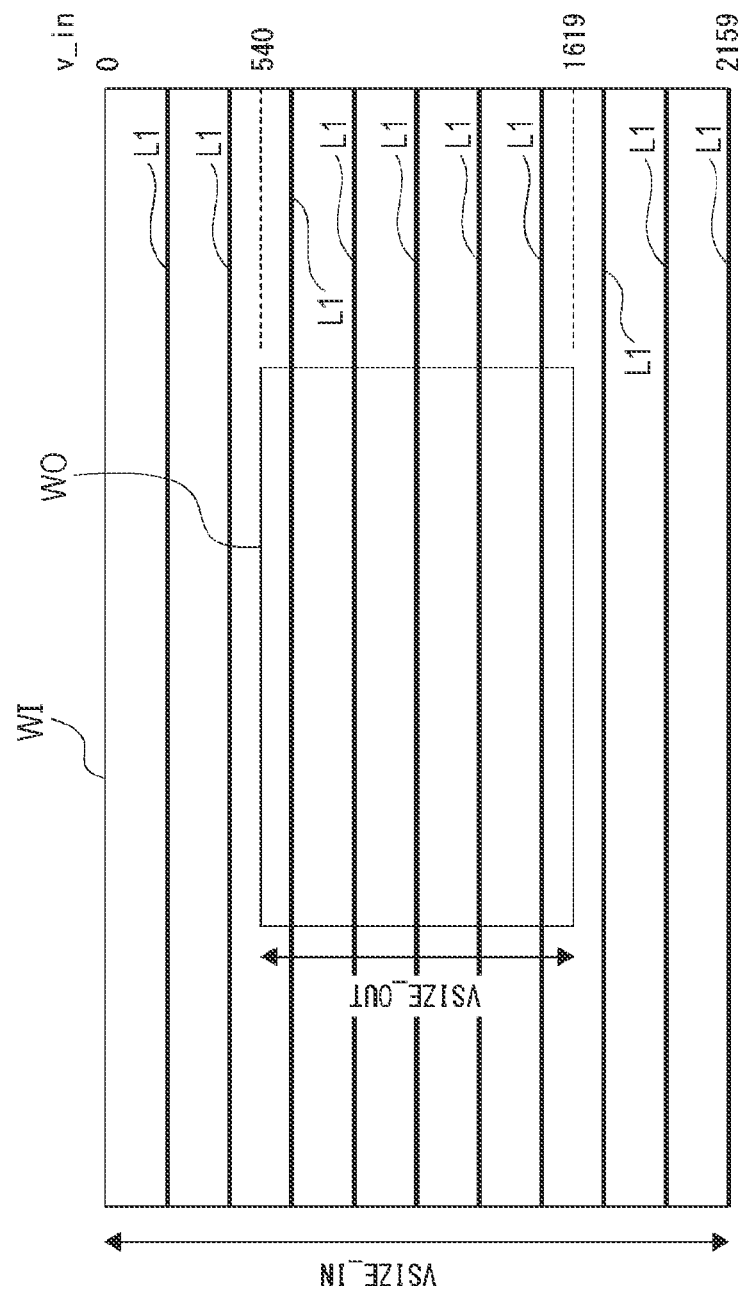
FIG. 8 is an explanatory diagram of a first virtual line and a second virtual line when camera posture is ideal posture.

Here, as shown in FIG. 8, consider the first virtual line L1 in the input image frame WI and the output image frame WO when the camera posture is the ideal posture.

The first virtual line L1 is a virtual line (for example, a straight line) corresponding to the rotation vector (posture information) obtained from the data (for example, IMU sample) detected for each line of the captured image of one frame or for each intermittent line, and it can be said that a plurality of the first virtual lines L1 exists in one frame.

If the camera that captured the image is in the ideal posture (the camera posture is originally horizontal), the center of the input image frame WI is only required to be cut out as the output image frame WO in FIG. 7 above.

Then, the first virtual line L1 on the input image corresponding to the camera posture may be a line on the output image corresponding to the camera posture.

That is, it is not necessary to use the second virtual line L2 as described above.

However, if the posture is not ideal, the accuracy will decrease.

Figure 9:
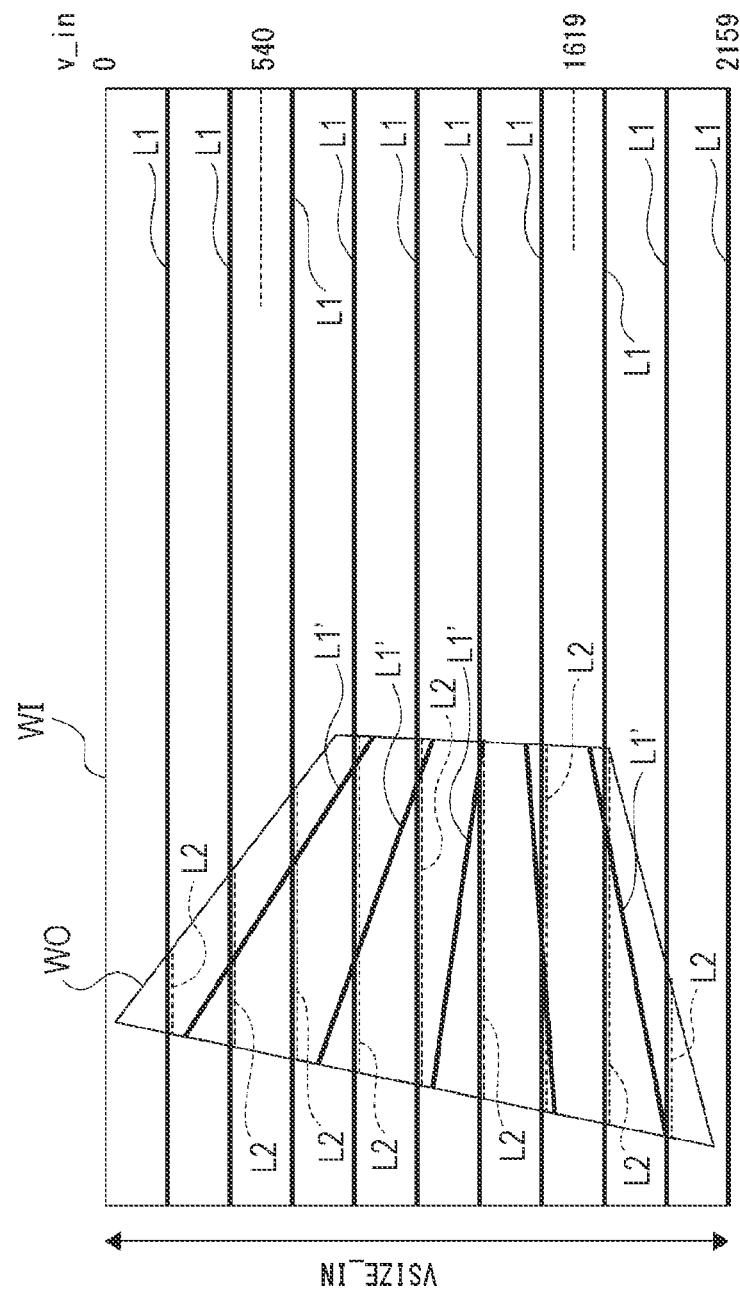
FIG. 9 is an explanatory diagram of a first virtual line and a second virtual line when camera posture is not ideal posture.

FIG. 9 shows the input image frame WI and the output image frame WO when the camera posture is not the ideal posture.

When the posture is not the ideal posture, for example, as shown in the drawing, the position and shape of the output image frame WO with respect to the input image frame WI change.

Here, in a case where the second virtual line L2 of the present embodiment is not used, for the output image frame WO, the input image frame WI of each pixel is obtained in a state where the first virtual line L1' is assumed for the posture information. The first virtual line L1' is a line corresponding to a pixel line in the horizontal direction in the output image.

However, in that case, since the first virtual line L1 and the first virtual line L1' are deviated from each other, the posture information of each pixel coordinate of the output image is not linked to the posture information of the input image.

In the present embodiment, the second virtual line L2 is calculated for such an output image frame WO as shown by the broken line, and thereby, corresponding point calculation is performed in a state of correctly corresponding to the first virtual line L1.

The reason why the first virtual line L1' has been used in the first place is as follows.

To correct the rolling shutter distortion, from among a plurality of camera postures calculated from a plurality of IMU data samples acquired during one frame period, it is necessary to use the camera posture close to the exposure timing of each line to correct the distortion for each line.

However, since it is difficult to determine which of the plurality of camera postures of the input image the pixel position of the output image corresponds to, the correspondence has been simply based on the assumption that the camera posture does not change. As long as the camera posture does not change, there is no problem even if the first virtual line L1 and the first virtual line L1' are deviated from each other because there is no difference in the actual posture information. It can be said that such a method corresponds the camera posture to the "horizontal one-dimensional line" of the output image.

Figure 10A:
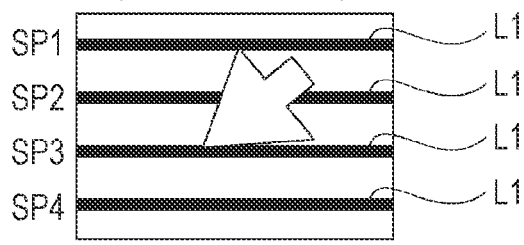
FIGS. 10A, 10B, and 10C are explanatory diagrams in a case of obtaining posture information of the output image using the first virtual line.

More specifically, in such a method, first, as shown in FIG. 10A, the input image and the IMU sample (camera posture) are associated with each other. The drawing shows samples SP1 to SP4 of the posture information of each first virtual line L1.

Figure 10B:
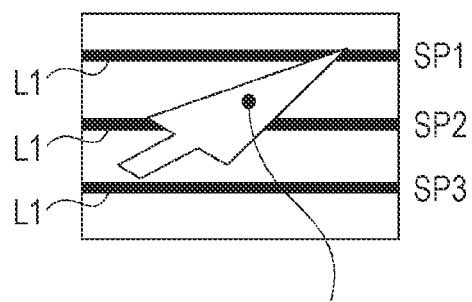

Next, as shown in FIG. 10B, the output image and the IMU sample are associated. At this time, the line number is simply converted on the assumption that the posture does not change.

Figure 10C:
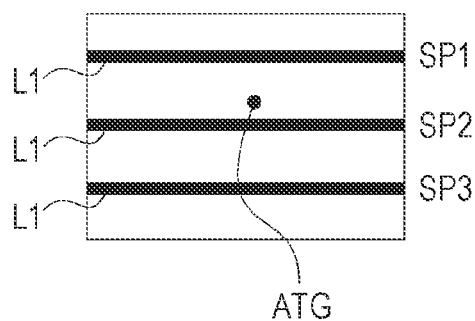

Here, the corresponding points on the input coordinates are searched for a pixel of interest ATG. Then, as shown in FIG. 10C, two samples (SP1 and SP2) in the vicinity of the pixel of interest are found, and linear interpolation is performed with the posture information of the samples SP1 and SP2 sandwiching the pixel of interest to acquire the posture information about the pixel of interest ATG.

While such a method is simple, it is on the assumption that the camera posture does not change, and therefore, in a case where the camera posture changes significantly, the correspondence between the camera posture and the pixel position of the output image deviates from the ideal, and the rolling shutter distortion correction does not work successfully.

For example, in a case where the camera posture is rotated 90 degrees around the optical axis, although the camera posture should correspond to the vertical line of the output image, the camera posture corresponds to the horizontal line.

Furthermore, for example, in a case where the camera posture is rotated 180 degrees around the optical axis, the correspondence between the camera posture and the output image line is upside down. In such a case, the rolling shutter distortion is emphasized.

To solve this problem, the corresponding points of the input image are only required to be accurately searched for coordinates of each pixel of the output image by backward mapping. However, this is not possible because the rotation matrix for coordinates of each pixel of the output image is unknown.

This is because the posture information (rotation information based on the posture information) is linked to the line of the input image, and the address of the conversion source cannot be traced from the pixels of the output image.

Figure 11:
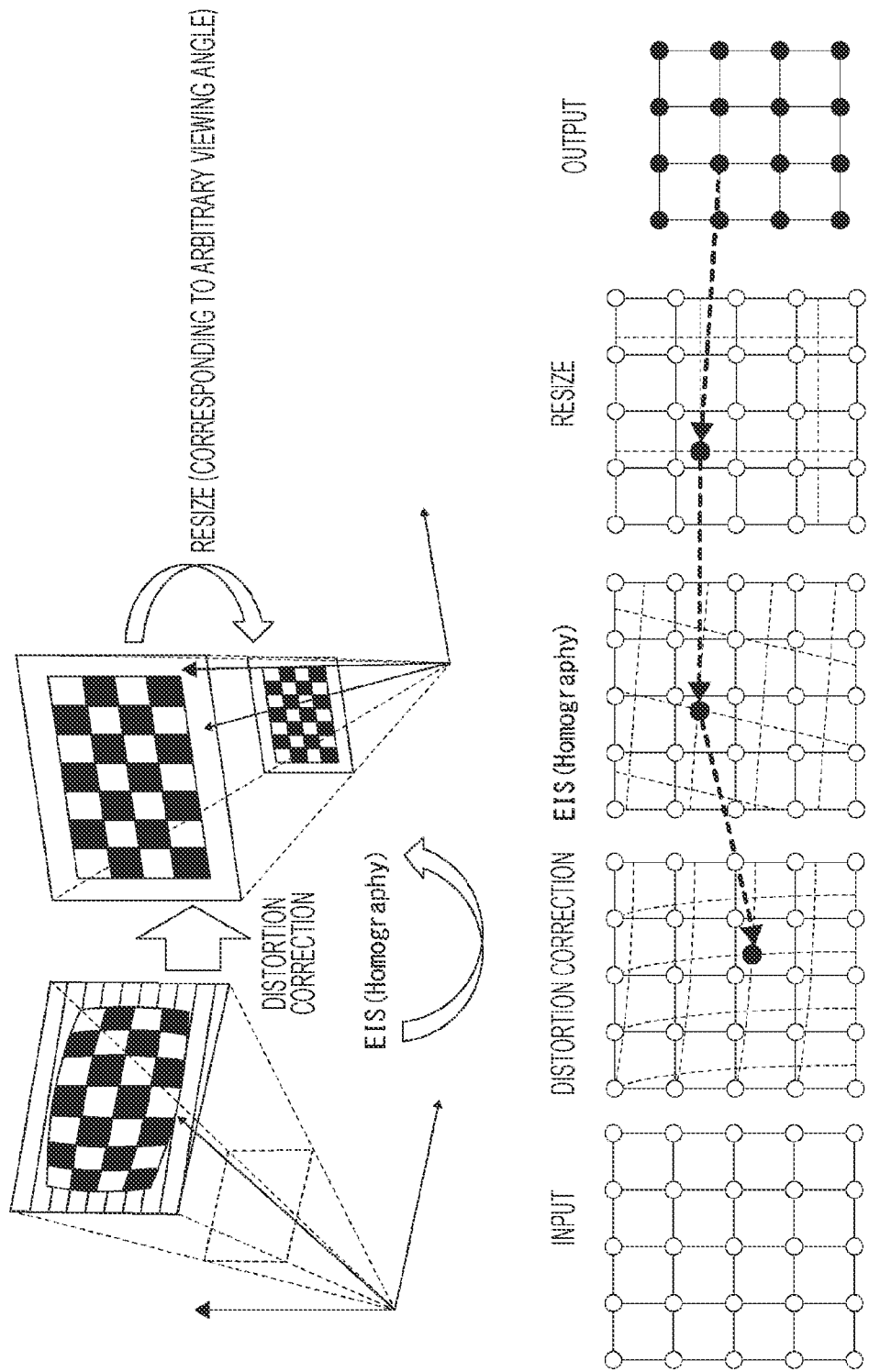
FIG. 11 is an explanatory diagram showing that rotation information is unknown for the coordinates of the output image.

FIG. 11 schematically shows that the output image is obtained by performing distortion correction, homography conversion (EIS), and resizing from the input image.

However, from the output image side, the rotation matrix of the inverse conversion for the homography conversion before resizing is unknown, and it is not possible to trace to the corresponding point of the input image.

Therefore, in the present embodiment, the corresponding point (posture information at the corresponding point) in the input image with respect to the pixel coordinates of the output image can be accurately obtained by a method of approximating by forward mapping and interpolation.

That is, the rotation information in the homography conversion generates the second virtual line L2 by performing the homography conversion of the first virtual line L1 of the input image by forward mapping, and propagates the corresponding rotation information. Then, the posture information is interpolated according to the coordinates of the output pixel.

Figure 12A:
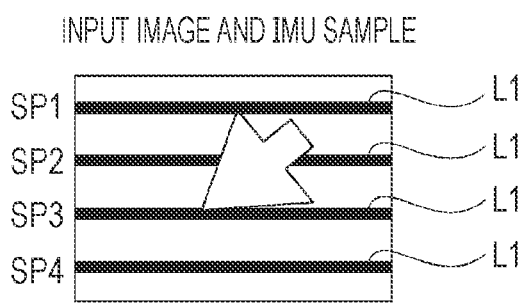
FIGS. 12A, 12B, and 12C are explanatory diagrams in a case of obtaining the posture information of the output image using a second virtual line.

As similar to FIG. 10A, FIG. 12A shows the correspondence (first virtual line L1) between the input image and the IMU sample (camera posture). Two-dimensional association is performed for this first virtual line L1.

Figure 12B:
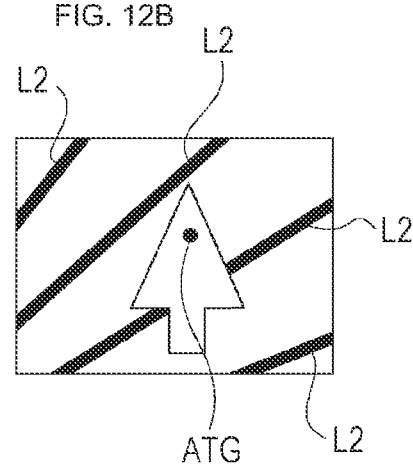

Then, as shown in FIG. 12B, with this first virtual line L1, by using the camera posture information corresponding to each of the IMU samples SP1 to SP4, the second virtual line L2 on the output image corresponding to the line of the exposure timing of the input image is calculated by correct homography calculation (forward mapping).

This makes the camera posture correspond to the "two-dimensional second virtual line L2 with an inclination" of the output image.

Specifically, the vector expression of the first virtual line L1 representing the line of the input image is rotated by a rotation matrix representing the camera posture and projected through perspective to correspond to the vector expression of the second virtual line L2 of the output image (two-dimensional with an inclination).

Figure 12C:
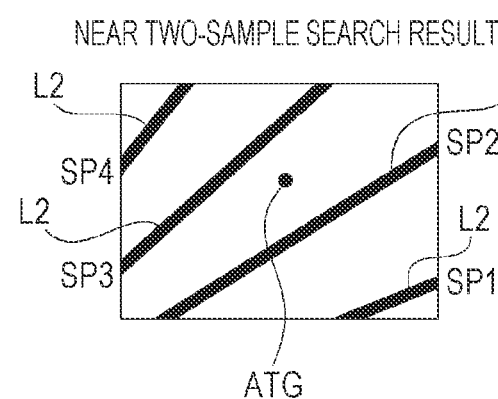

Thereafter, as shown in FIG. 12C, for each pixel (pixel of interest ATG) of the output image, two lines sandwiching the position of the pixel of interest ATG are searched for from the two-dimensional second virtual line L2.

In this case, since the second virtual line L2 is a two-dimensional straight line, the equation of the positional relationship between the straight line and the point can be obtained by using the outer product. Specifically, when the positional relationship between a straight line and a point changes, the sign (+/−) of the outer product of the vector changes.

Then, the posture information of the pixel of interest ATG is calculated by linearly interpolating the posture information of the two neighboring samples.

By such processing, the posture information can be obtained accurately for each pixel of the output image regardless of the change in the camera posture.

Figure 13B:
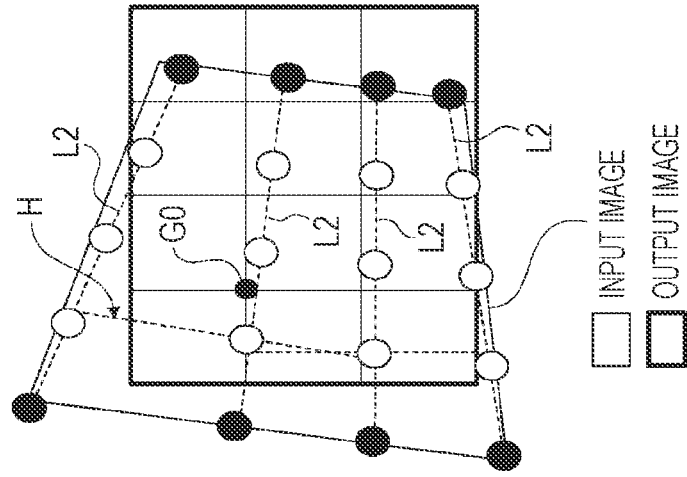
FIGS. 13A and 13B are explanatory diagrams for obtaining information on the output image by rotation and interpolation from the input image.
Figure 13A:
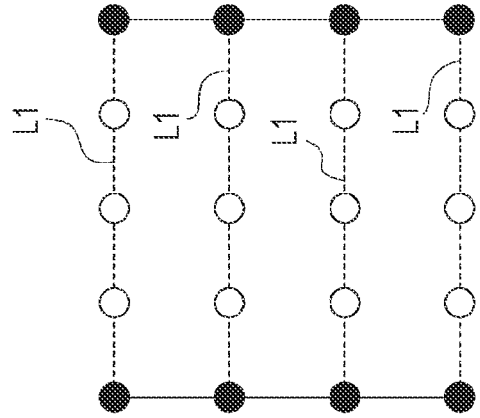

Here, FIG. 13A shows the pixels in the input image. It is assumed that the broken line indicates the first virtual line L1. FIG. 13B shows the rotated second virtual line L2, the pixels of the input image, and the range of the output image.

In the input image forward-mapped in the state of FIG. 13B, the rotation changes for each first virtual line L1, so that even if the perpendicular line H from the grid point is homography-transformed and extended, the result line does not intersect with the adjacent grid point.

Furthermore, the output pixel GO is not necessarily on top of the forward mapping, so that interpolation processing that matches the output coordinates is required.

Then, since the perpendicular lines passing through the grid point do not intersect, the interpolation to be solved analytically cannot be used.

In consideration of these facts, in the present embodiment, the following interpolation processing is performed in order to obtain the posture information corresponding to the output pixel coordinates.

Figure 14:
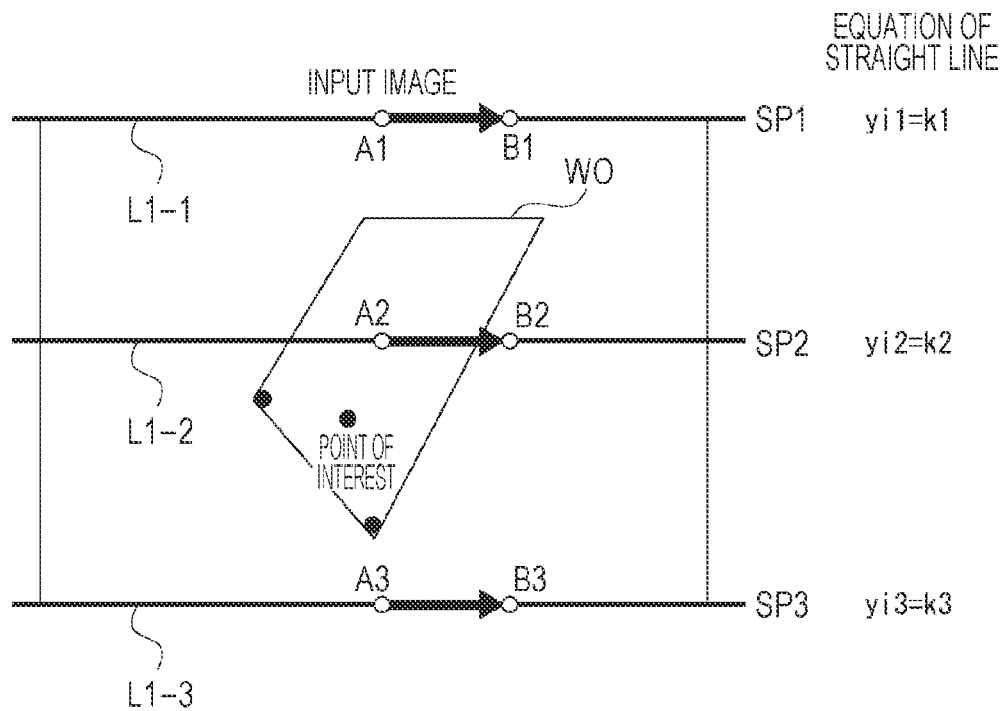
FIG. 14 is an explanatory diagram of processing for acquiring posture information of the output image of the embodiment.

FIG. 14 shows the output image frame WO in the input image, and also shows first virtual lines L1-1, L1-2, and L1-3 as the first virtual lines L1 corresponding to IMU samples SP1, SP2, and SP3, respectively.

Two points An and Bn are placed on each first virtual line L1 (L1-1, L1-2, or L1-3). (n=1, 2, 3 . . . )

In the drawing, A1 and B1 are set on the first virtual line L1-1 of the IMU sample SP1, A2 and B2 are set on the first virtual line L1-2 of the IMU sample SP2, and A3 and B3 are set on the first virtual line L1-3 of the IMU sample SP3.

Figure 15:
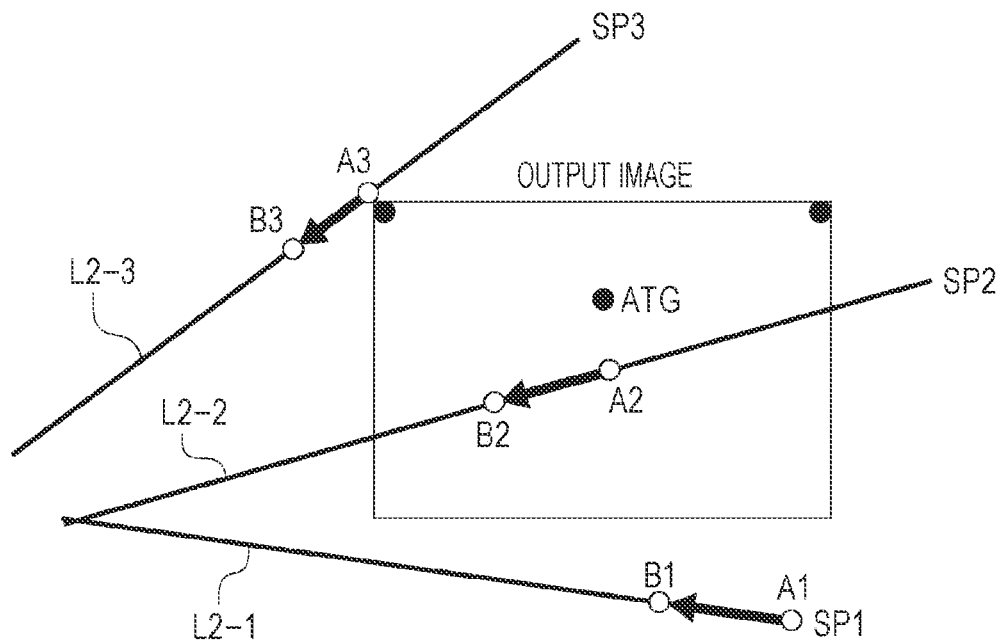
FIG. 15 is an explanatory diagram of processing for acquiring posture information of the output image of the embodiment.

As shown in FIG. 15, these two points An and Bn are projected onto the output image by transposing the rotation matrix corresponding to the IMU sample (SP1, SP2, or SP3).

The second virtual lines L2 (L2-1, L2-2, and L2-3) obtained by rotating the first virtual lines L1-1, L1-2, and L1-3, respectively with respect to the output image are obtained.

Here, the positional relationship between the pixel of interest ATG and the second virtual line L2 of each IMU sample is determined on the coordinates of the output image. Specifically, it is determined whether the pixel of interest ATG is above, on a straight line, or below each of the second virtual lines L2-1, L2-2, and L2-3.

Figure 16:
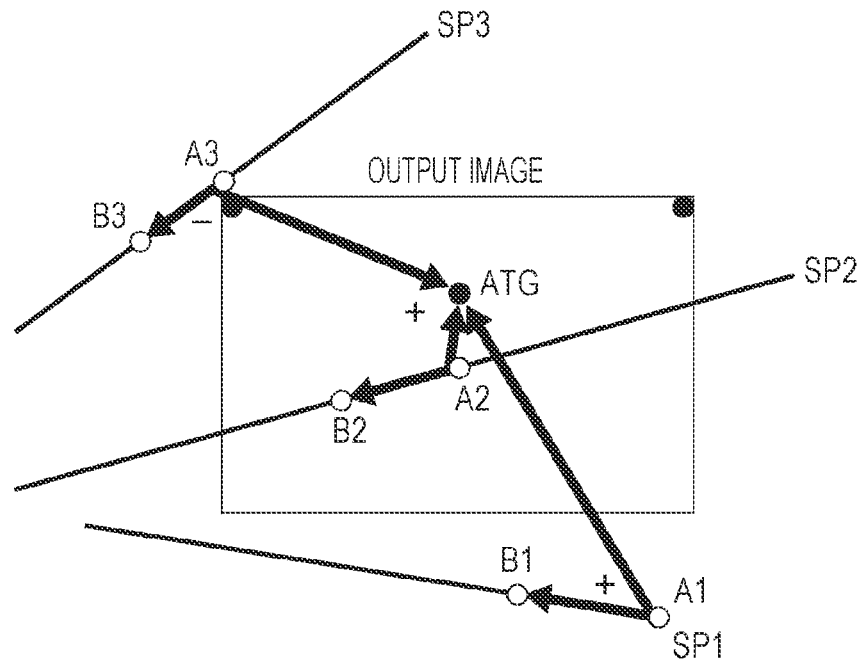
FIG. 16 is an explanatory diagram of processing for acquiring posture information of the output image of the embodiment.

Therefore, the outer product of the vector An to ATG and the vector An to Bn shown in FIG. 16 is calculated.

The vector An to ATG is the vector from the point A1 to the pixel of interest ATG for the second virtual line L2-1, the vector from the point A2 to the pixel of interest ATG for the second virtual line L2-2, and the vector from the point A3 to the pixel of interest ATG for the second virtual line L2-3.

The vector An to Bn is the vector from the point A1 to the point B1 for the second virtual line L2-1, the vector from the point A2 to the point B2 for the second virtual line L2-2, and the vector from the point A3 to the point B3 for the second virtual line L2-3.

The value of the outer product obtained for each second virtual line L2 is the direction of the z-axis.

If the sign of the outer product is +, the pixel of interest ATG is above the second virtual line L2, if the absolute value of the outer product is 0, the pixel of interest ATG is on the second virtual line L2, and if the sign of the outer product is −, the pixel of interest ATG is below the second virtual line L2.

In the case of FIG. 16, the outer product is +, +, and − for n=1, 2, and 3, respectively. That is, in this case, the pixel of interest ATG is between the second virtual line L2-2 and the second virtual line L2-3.

Figure 17:
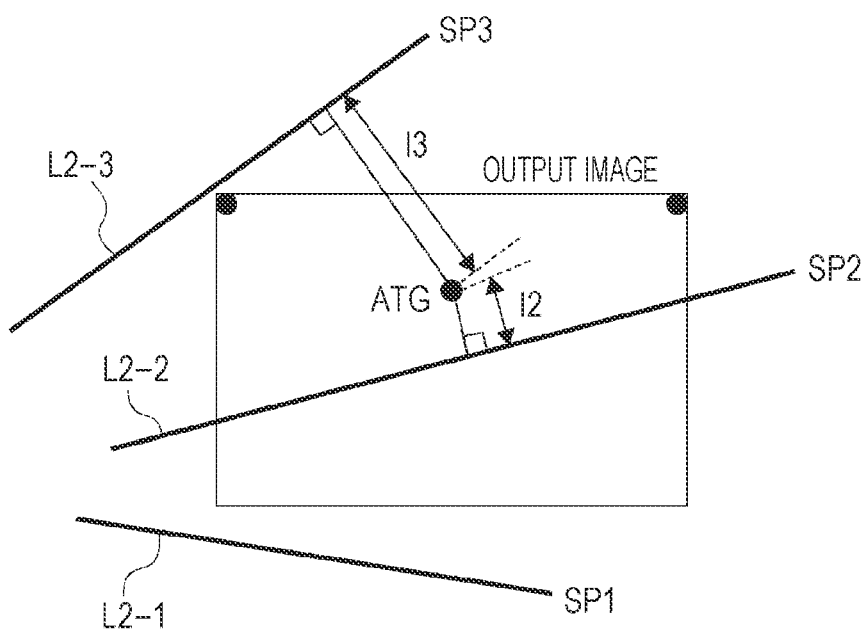
FIG. 17 is an explanatory diagram of processing for acquiring posture information of the output image of the embodiment.

Next, as shown in FIG. 17, distances 12 and 13 between the pixel of interest ATG and the two second virtual lines L2-2 and L2-3 selected as described above are obtained. That is, the distances are the lengths of the perpendicular line from the pixel of interest ATG to the second virtual lines L2-2 and L2-3.

Then, the rotation vectors r2 and r3 corresponding to the second virtual line L2-2 (IMU sample SP2) and the second virtual line L2-3 (IMU sample SP3) are linearly interpolated with the weights of the distances 13 and 12, and the result is the rotation vector r of the pixel of interest ATG.

From the above, the rotation vector r of the pixel of interest ATG can be obtained.

As described above, the camera posture association unit 21 performs processing of rotating the first virtual line L1 according to the posture information to obtain the second virtual line L2 which is a virtual straight line on the output image, and calculating the corresponding second virtual line L2 for each pixel of the output image, and obtaining the posture information on the basis of the corresponding second virtual line L2, so that the rolling shutter distortion can be corrected with high accuracy.

<3. Camera Posture Association Processing>

Figure 18:
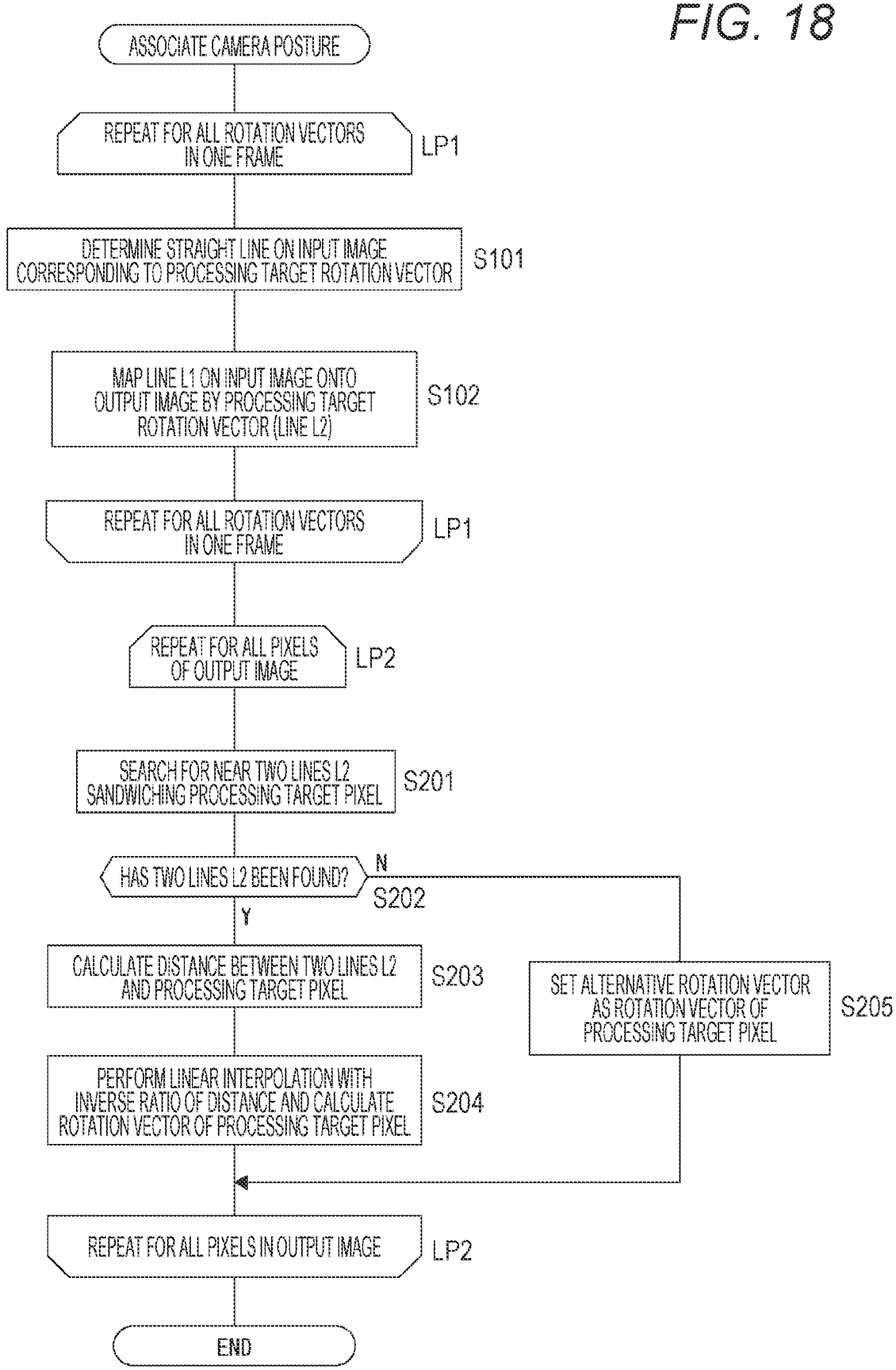
FIG. 18 is a flowchart of camera posture association processing according to the embodiment.

FIG. 18 shows a specific example of the processing of the camera posture association unit 21.

The camera posture association unit 21 performs the processing of steps S101 to S102 for all the rotation vectors in one frame of the image data as loop processing LP1 of FIG. 18.

In step S101, the camera posture association unit 21 obtains the first virtual line L1 on the input image corresponding to the rotation vector to be processed.

In step S102, the camera posture association unit 21 rotates the first virtual line L1 on the input image according to the value of the rotation vector of the processing target, and maps the result on the output image as the second virtual line L2.

After completing the above processing for all the rotation vectors, the camera posture association unit 21 subsequently performs the processing of steps S201 to S205 for all the pixels of the output image as loop processing LP2.

In step S201, the camera posture association unit 21 searches for two second virtual lines L2 in the vicinity sandwiching the pixel to be processed (pixel coordinates of the pixel of interest ATG). This is obtained by calculating the vector outer product as shown in FIG. 16 above.

In step S202, the camera posture association unit 21 branches the processing depending on whether or not the two second virtual lines L2 can be found.

In a case where the two second virtual lines L2 are found, the process proceeds to step S203 and the camera posture association unit 21 calculates the distance between the two second virtual lines L2 and the pixel of interest ATG to be processed.

Then, in step S204, the camera posture association unit 21 performs linear interpolation with the inverse ratio of the calculated distance, and calculates the rotation vector (posture information) of the pixel of interest ATG. That is, the processing described with reference to FIG. 17 is performed.

In a case where it is determined in step S202 that the two second virtual lines L2 cannot be found, the process proceeds to step S205 and the camera posture association unit 21 sets an alternative rotation vector as the rotation vector (posture information) of the pixel of interest ATG to be processed.

From the above, the rotation vector is obtained for coordinates of each pixel of the output image.

Thereafter, as processing of the reference coordinate calculation unit 2, for coordinates of each pixel, the reference coordinates to be cut out from the input image is obtained by using the obtained rotation vector.

From the input image data read from the frame buffer 5 using the reference coordinates, a pixel value of coordinates of each pixel of the output image is generated by the interpolation processing with the interpolation filter 7, and is output as the output image PO. As a result, an output image PO that has been subjected to the rolling shutter distortion correction as well as blur correction by the EIS can be obtained.

<4. Configuration of Signal Processing Device of Second Embodiment>

Figure 19:
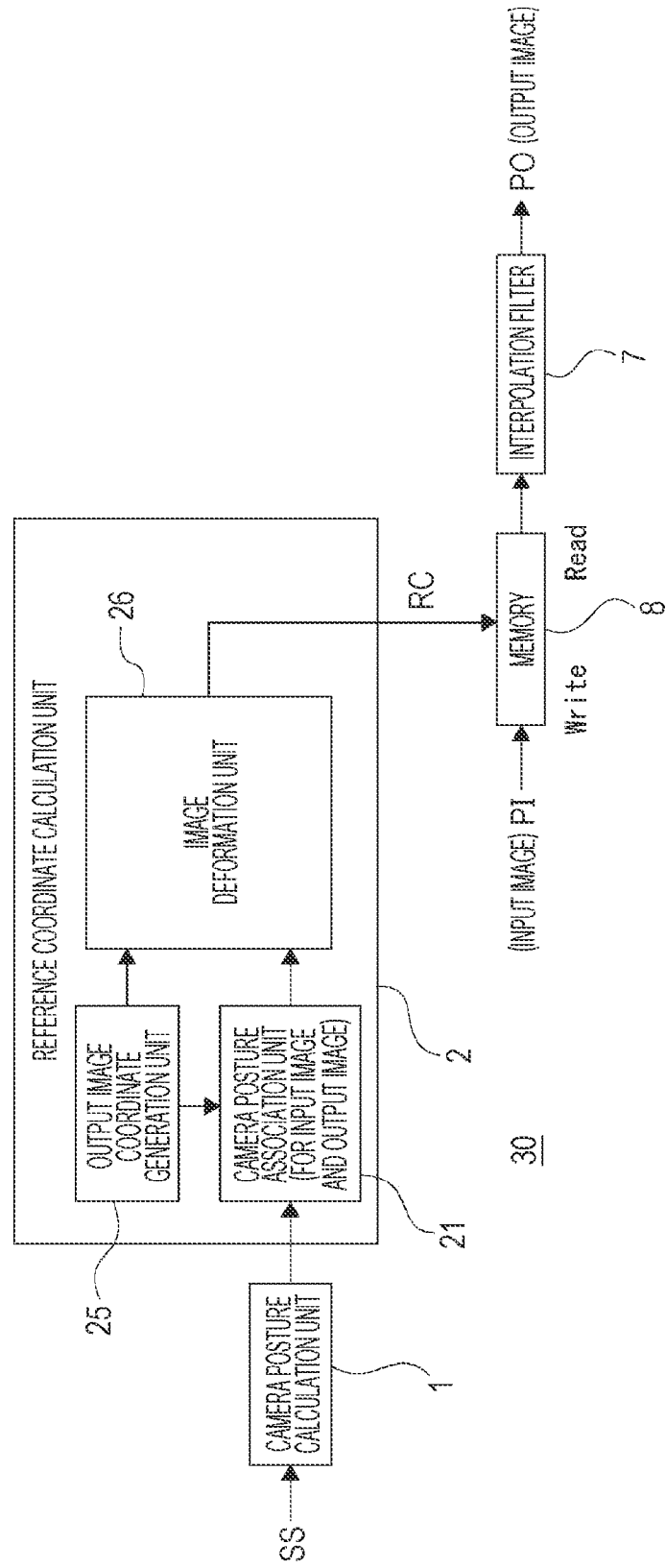
FIG. 19 is a block diagram of a signal processing device according to a second embodiment.

FIG. 19 shows a configuration of the signal processing device 30 of a second embodiment.

The signal processing device 30 of FIG. 19 is shown as having a necessary configuration for the EIS and rolling shutter distortion correction.

The signal processing device 30 includes the camera posture calculation unit 1, the reference coordinate calculation unit 2, the interpolation filter 7, and a memory 8. The reference coordinate calculation unit 2 includes the camera posture association unit 21, an output image coordinate generation unit 25, and an image deformation unit 26.

Image data captured by an integrated or separate camera is written in the memory 8 as an input image PI. Then, from the memory 8, the data of the necessary pixels in the input image PI is read out on the basis of the reference coordinates RC, and the interpolation processing is performed with the interpolation filter 7 to obtain the output image PO.

Posture detection data SS is input to the camera posture calculation unit 1. The posture detection data SS is, for example, the above-mentioned IMU data or other detection data according to the camera posture. The posture detection data SS is associated with the input image PI line.

The camera posture calculation unit 1 calculates posture information, for example, a rotation vector, using the posture detection data SS and supplies the posture information to the reference coordinate calculation unit 2.

In the reference coordinate calculation unit 2, the camera posture association unit 21 performs similar processing to that in the first embodiment. The output image coordinate generation unit 25 gives an instruction on the coordinates of the pixel of interest as in the output image coordinate counter 22 in FIG. 1, for example.

The image deformation unit 26 performs coordinate-based image deformation as in the homography conversion unit 23 of FIG. 1, for example. The image deformation unit 26 may perform, for example, a central projection and three-dimensional rotation as homography conversion, conversion of mapping and rotating on a virtual celestial sphere, or equidistant projection and three-dimensional rotation.

Then, the reference coordinate calculation unit 2 performs processing of obtaining the reference coordinates RC corresponding to each pixel coordinate of the output image PO according to the configuration, as similar to the first embodiment.

Note that, here, a configuration example in which the lens distortion correction unit 24 of FIG. 1 is not provided is shown.

The signal processing device 30 can be realized even with such a configuration shown in FIG. 19, and the signal processing device 30 may be built in the imaging device or may be a device separate from the imaging device.

<5. Summary and Modification>

According to the above embodiment, the following effects can be obtained.

The signal processing device 30 of the embodiment includes the camera posture calculation unit 1 that calculates posture information corresponding to a line of an input image. The signal processing device 30 includes the camera posture association unit 21 that performs processing of rotating the first virtual line L1, which is a virtual line in the line direction of the input image in which the calculated posture information is common, according to the posture information to obtain the second virtual line L2 which is a virtual line on the output image, and calculating the corresponding second virtual line L2 for each pixel of the output image, and obtaining the posture information on the basis of the corresponding second virtual line L2. Further, the signal processing device 30 includes the image deformation unit (the homography conversion unit 23 or the image deformation unit 26) that calculates, for coordinates of each pixel of the output image, the reference coordinates on the input image corresponding to the pixel coordinates by using the posture information associated in the camera posture association unit 21.

That is, in the embodiment, as a correspondence between the input image and the IMU sample (first virtual line L1 in the camera posture), for example, homography operation is performed in the posture corresponding to each IMU sample, and the second virtual line L2 is mapped two-dimensionally onto the output image.

Furthermore, as a correspondence between the output image and the IMU sample, two samples (two second virtual lines L2) near the pixel of interest are searched for. Then, as a result of searching for near two samples, linear interpolation is performed with the posture information of the two second virtual lines L2 sandwiching the pixel of interest, and the posture information of the pixel is obtained.

Therefore, it is possible to associate appropriate camera posture to each pixel position of the output image, and rolling shutter distortion correction can be performed with high accuracy even if the posture change is large.

The signal processing device 30 of the embodiment further includes the reference pixel acquisition unit (the cache 6 or the memory 8) that reads reference pixel data from a storage unit that stores pixel data of the input image on the basis of the reference coordinates for coordinates of each pixel of the output image, and the interpolation unit (interpolation filter 7) that performs interpolation processing using the reference pixel data to generate pixel data included in an output image.

That is, in order to obtain each pixel of the output image, the pixel data of the input image is acquired on the basis of the reference coordinates obtained for each pixel, and the interpolation processing is performed.

Therefore, it is possible to obtain image data as an output image by the EIS processing, that is, an image that can be obtained when the camera posture is in a horizontal state.

In the embodiment, the second virtual line L2 is a plurality of lines to which rotation of a rotation angle indicated by the respective pieces of posture information is given for the plurality of the first virtual lines L1.

That is, the second virtual line L2 is a line two dimensionally expressed to be tilted on the output image by giving the same rotation as the rotation angle indicated by the posture information to each of the horizontal one-dimensional first virtual lines L1 corresponding to the line in the input image. Accordingly, in a case where the first virtual lines L1 have different pieces of posture information, the second virtual lines L2 are lines rotated according to the pieces of posture information.

That is, in a case where the image is captured by the rolling shutter method, the posture information corresponding to each line of the input image may be different, which is also reflected in the second virtual line L2.

Therefore, the second virtual line L2 expresses the posture information corresponding to the pixel coordinates on the output image frame cut out from the input image and rotated.

Accordingly, the second virtual line L2 is a line that correctly associates the posture information with each pixel of the output image.

The camera posture association unit 21 of the embodiment obtains two second virtual lines L2 having a relationship in which the pixel coordinates are sandwiched as the corresponding second virtual line L2 for coordinates of each pixel of the output image, and obtains the posture information of the pixel coordinates by processing using the two second virtual lines L2.

The second virtual line L2 is a line that is two-dimensionally expressed by projecting the line of the input image on the output image, and since the rotation angle changes for each line, lattice points (pixel coordinates) are not always match in the input image and the output image. Then, the two second virtual lines L2 that sandwich the pixel coordinates are searched for. If two second virtual lines L2 sandwiching the pixel of interest to be processed are obtained, the posture information of the pixel of interest can be obtained by linear interpolation from each posture information of the two second virtual lines L2, for example. Therefore, accurate posture information can be obtained for coordinates of each pixel of the output image even if the correspondence between the pixel coordinates of the input image and the output image does not match.

The example has been described in which the posture association unit 21 uses an outer product of a vector on the second virtual line L2 and a vector extending from the second virtual line L2 to the pixel coordinates to be processed to determine two second virtual lines L2 that serve as the second virtual lines L2 corresponding to the pixel coordinates, for each of the plurality of second virtual lines L2.

That is, the determination of the two second virtual lines L2 is performed using the positional relationship between the straight line and the point according to the sign of the vector outer product. By using the outer product, the positional relationship between the pixel of interest in the output image and each second virtual line (whether the coordinates of the pixel of interest are above the second virtual line, on the second virtual line, or below the second virtual line) can be determined, and the two second virtual lines corresponding to the pixel of interest can be accurately determined.

The posture association unit 21 of the embodiment performs linear interpolation by the inverse ratio of a distance of a perpendicular line from the pixel coordinates of the processing target to the corresponding two second virtual lines L2 to obtain the posture information of the pixel coordinates.

Therefore, the posture information of the coordinates of the pixel of interest can be obtained by accurate and easy interpolation calculation according to the position state sandwiched between the two second virtual lines L2.

In the embodiment, an example has been described in which the posture information is a rotation vector representing the tilt of the imaging device by a three-dimensional vector.

The posture information of the camera can be expressed by the rotation vector. By rotating at a three-dimensional rotation angle represented by the rotation vector, it is possible to calculate the reference coordinates for the EIS and generate the second virtual line.

Note that the posture information is not limited to the rotation vector, and a quaternion, a rotation matrix (SO3), Euler angles, or the like may be used.

The signal processing device 30 of the embodiment further includes the output image coordinate generation unit (the output image coordinate counter 22 or the output image coordinate generation unit 25) that sequentially instruct the camera posture association unit 21 and the homography conversion unit 23 (or the image deformation unit 26) on the coordinates of each pixel of the output image to be processed.

For example, each pixel sequentially becomes a processing target in the posture association unit and the image deformation unit in raster order or the like by a counter that sequentially specifies each pixel of the image in the horizontal direction and the vertical direction.

Therefore, the reference coordinates are sequentially calculated for coordinates of each pixel included in the output image.

In the embodiment, the camera posture association unit 21 and the homography conversion unit 23 (or the image deformation unit 26) calculate the pixel coordinates of the input image referred to for generation of the pixel value of coordinates of each pixel of the output image, by operation for the coordinate point, and set the result as the reference coordinates RC.

That is, the image data (each pixel data) is not used, but the operation for obtaining the correspondence between the coordinates is performed. Therefore, the processing of the reference coordinate calculation unit 2 is only operation for the coordinate point and does not use the pixel value, so that the processing load is not excessive.

The signal processing device 30 of the embodiment includes the storage unit (frame buffer 5 or memory 8) that stores pixel data of the input image.

The input image that has been captured and input is subjected to necessary processing such as block conversion and stored in the storage unit. Therefore, the pixel value of coordinates of each pixel included in the output image can be read out, and the EIS processing and the rolling shutter distortion correction can be appropriately performed.

In the embodiment, an example has been described in which the reference coordinates RC are reference coordinates for realizing the posture correction and the lens distortion correction of the input image in the output image.

Therefore, it is possible to obtain an output image in which the lens distortion is also corrected.

Note that, as the lens distortion correction, a distortion model of the central projection, for example, correction by the lens distortion model of Tsai, a fisheye lens distortion model, correction of distortion from equidistant projection, correction using a conversion table, and the like are conceivable.

In the embodiment, an example has been described in which the input image is a captured image signal associated with the posture detection data.

The captured image signal captured by the imaging device (camera) is used as the input image, and the posture detection data of the camera, for example, an IMU sample, is associated with the captured image signal.

This makes it possible to obtain the posture information corresponding to the line of the input image.

In the embodiment, an example has been described in which the posture detection data is angular velocity data and acceleration data. That is, the IMU sample is associated with the captured image signal.

The angular velocity data and acceleration data as IMU samples are supplied to the camera posture calculation unit 1, and the rotation vector is obtained. This makes it possible to obtain the posture information corresponding to the line of the input image.

In the embodiment, the configuration example of the imaging device 31 including the signal processing device 30 of FIG. 1 has been described.

That is, an example has been described in which the imaging device 31 includes: the imaging unit (imager 11) that receives subject light incident via the optical system and images the subject; the detection unit (IMU 10) that obtains posture detection data at the time of imaging of the imaging unit; the signal processing device 30 (camera posture calculation unit 1, camera posture association unit 21, homography conversion unit 23 (or image deformation unit 26), the reference pixel acquisition unit (cache 6 or memory 8), and the interpolation unit (interpolation filter 7).

With such a configuration, appropriate rolling shutter distortion correction can be realized in the imaging device 31 (for example, a digital camera).

Note that the signal processing device 30 shown in FIGS. 1 and 19 is not necessarily configured to be built in the imaging device. For example, the signal processing device 30 may be configured as an independent device. Furthermore, the signal processing device 30 may be a device built in a device for inputting image data captured by the imaging device, for example, an image editing device, a communication device, an information processing device, a server device, a television device, an image recording device, an image reproduction device, a display device, or the like.

Note that the effects described in the present specification are merely examples and are not intended to be limiting, and other effects may be provided.

Note that the present technology can adopt the following configuration.

(1)

A signal processing device including:

a posture calculation unit that calculates posture information corresponding to a line of an input image;

a posture association unit that rotates a first virtual line, which is a virtual line in a line direction of the input image for which the posture information calculated is common, according to the posture information to obtain a second virtual line, which is a virtual line on an output image to calculate a corresponding second virtual line corresponding to each pixel of the output image to obtain posture information on the basis of the corresponding second virtual line; and an image deformation unit that uses the posture information associated by the posture association unit to calculate, for coordinates of each pixel of the output image, reference coordinates on the input image corresponding to the coordinates of each pixel.

(2)

The signal processing device according to (1) described above, further including:

a reference pixel acquisition unit that reads reference pixel data from a storage unit that stores pixel data of the input image on the basis of the reference coordinates for each pixel coordinates of the output image; and an interpolation unit that performs interpolation processing using the reference pixel data to generate pixel data included in an output image.

(3)

The signal processing device according to (1) or (2) described above, in which the second virtual line is a plurality of lines to which rotation of the rotation angle indicated by each posture information is given for each of a plurality of the first virtual lines.

(4)

The signal processing device according to any one of (1) to (3) described above, in which the posture association unit obtains two second virtual lines having a relationship in which the pixel coordinates are sandwiched as the corresponding second virtual line for pixel coordinates of the output image, and obtains the posture information of the pixel coordinates by processing using the two second virtual lines.

(5)

The signal processing device according to (4) described above, in which the posture association unit uses an outer product of a vector on the second virtual line and a vector extending from the second virtual line to the pixel coordinates to be processed to determine two second virtual lines that serve as the second virtual lines corresponding to the pixel coordinates, for each of the plurality of second virtual lines.

(6)

The signal processing device according to (4) or (5) described above, in which the posture association unit performs linear interpolation by an inverse ratio of a distance of a perpendicular line from the pixel coordinates to be processed to the corresponding two second virtual lines to obtain the posture information of the pixel coordinates.

(7)

The signal processing device according to any one of (1) to (6) described above, in which the posture information is a rotation vector representing tilt of an imaging device by a three-dimensional vector.

(8)

The signal processing device according to any one of (1) to (7) described above, further including an output image coordinate generation unit that sequentially instructs the posture association unit and the image deformation unit on the coordinates of each pixel of the output image to be processed.

(9)

The signal processing device according to any one of (1) to (8) described above, in which the posture association unit and the image deformation unit calculate the pixel coordinates of the input image referred to for generation of a pixel value of coordinates of each pixel of the output image, by operation for a coordinate point, and set a result as the reference coordinates.

(10)

The signal processing device according to any one of (1) to (9) described above, further including a storage unit that stores pixel data of the input image.

(11)

The signal processing device according to any one of (1) to (9) described above, in which the reference coordinates are reference coordinates for realizing posture correction and lens distortion correction of the input image in the output image.

(12)

The signal processing device according to any one of (1) to (11) described above, in which the input image is a captured image signal associated with posture detection data.

(13)

The signal processing device according to (12) described above, in which the posture detection data is angular velocity data and acceleration data.

(14)

An imaging device including:

an imaging unit that receives subject light incident via an optical system and images a subject;

a detection unit that obtains posture detection data at the time of imaging of the imaging unit;

a posture calculation unit that uses the posture detection data to calculate posture information corresponding to a line of an input image from the imaging unit;

a posture association unit that rotates a first virtual line, which is a virtual line in a line direction of the input image for which the posture information calculated is common, according to the posture information to obtain a second virtual line, which is a virtual line on an output image to calculate a corresponding second virtual line corresponding to each pixel of the output image to obtain posture information on the basis of the corresponding second virtual line;

an image deformation unit that uses the posture information associated by the posture association unit to calculate, for coordinates of each pixel of the output image, reference coordinates on the input image corresponding to the coordinates of each pixel;

a reference pixel acquisition unit that reads reference pixel data from a storage unit that stores pixel data of the input image on the basis of the reference coordinates for the coordinates of each pixel of the output image; and an interpolation unit that performs interpolation processing using the reference pixel data to generate pixel data included in the output image.

(15)

A signal processing method including, by a signal processing device, posture calculation processing of calculating posture information corresponding to a line of an input image, posture association processing of rotating a first virtual line, which is a virtual line in a line direction of the input image for which the posture information calculated is common, according to the posture information to obtain a second virtual line, which is a virtual line on an output image to calculate a corresponding second virtual line corresponding to each pixel of the output image to obtain posture information on the basis of the corresponding second virtual line, and conversion processing of using the posture information associated by the posture association processing to calculate, for coordinates of each pixel of the output image, reference coordinates on the input image corresponding to the coordinates of each pixel.

REFERENCE SIGNS LIST

1 Camera posture calculation unit
2 Reference coordinate calculation unit
3 Data separation unit
4 Block conversion unit
5 Frame buffer
6 Cache
7 Interpolation filter
8 Memory
10 IMU
11 Imager
21 Camera posture association unit
22 Output image coordinate counter
23 Homography conversion unit
24 Lens distortion correction unit
25 Output image coordinate generation unit
26 Image deformation unit
30 Signal processing device
31 Imaging device

The invention claimed is:

1. A signal processing device comprising:

a posture calculation unit that calculates posture information corresponding to a line of an input image;

a posture association unit that rotates a first virtual line, which is a virtual line in a line direction of the input image for which the posture information calculated is common, according to the posture information to obtain a second virtual line, which is a virtual line on an output image to calculate a corresponding second virtual line corresponding to each pixel of the output image to obtain posture information on a basis of the corresponding second virtual line; and an image deformation unit that uses the posture information associated by the posture association unit to calculate, for coordinates of each pixel of the output image, reference coordinates on the input image corresponding to the coordinates of each pixel.

2. The signal processing device according to claim 1, further comprising:

a reference pixel acquisition unit that reads reference pixel data from a storage unit that stores pixel data of the input image on a basis of the reference coordinates for the coordinates of each pixel of the output image; and an interpolation unit that performs interpolation processing using the reference pixel data to generate pixel data included in the output image.

3. The signal processing device according to claim 1, wherein the second virtual line is a plurality of lines to which rotation of the rotation angle indicated by each posture information is given for each of a plurality of the first virtual lines.

4. The signal processing device according to claim 1, wherein the posture association unit obtains two second virtual lines having a relationship in which the pixel coordinates are sandwiched as the corresponding second virtual line for the coordinates of each pixel of the output image, and obtains the posture information of the pixel coordinates by processing using the two second virtual lines.

5. The signal processing device according to claim 4, wherein the posture association unit uses an outer product of a vector on the second virtual line and a vector extending from the second virtual line to the pixel coordinates to be processed to determine two second virtual lines that serve as the second virtual lines corresponding to the pixel coordinates, for each of the plurality of second virtual lines.

6. The signal processing device according to claim 4, wherein the posture association unit performs linear interpolation by an inverse ratio of a distance of a perpendicular line from the pixel coordinates to be processed to the corresponding two second virtual lines to obtain the posture information of the pixel coordinates.

7. The signal processing device according to claim 1, wherein the posture information is a rotation vector representing tilt of an imaging device by a three-dimensional vector.

8. The signal processing device according to claim 1, further comprising an output image coordinate generation unit that sequentially instructs the posture association unit and the image deformation unit on the coordinates of each pixel of the output image to be processed.

9. The signal processing device according to claim 1,
wherein the posture association unit and the image deformation unit calculate the pixel coordinates of the input image referred to for generation of a pixel value of coordinates of each pixel of the output image, by operation for a coordinate point, and set a result as reference coordinates.

10. The signal processing device according to claim 1, further comprising
a storage unit that stores pixel data of the input image.

11. The signal processing device according to claim 1,
wherein the reference coordinates are reference coordinates for realizing posture correction and lens distortion correction of the input image in the output image.

12. The signal processing device according to claim 1,
wherein the input image is a captured image signal associated with posture detection data.

13. The signal processing device according to claim 12,
wherein the posture detection data is angular velocity data and acceleration data.

14. An imaging device comprising:
an imaging unit that receives subject light incident via an optical system and images a subject;
a detection unit that obtains posture detection data at time of imaging of the imaging unit;
a posture calculation unit that uses the posture detection data to calculate posture information corresponding to a line of an input image from the imaging unit;
a posture association unit that rotates a first virtual line, which is a virtual line in a line direction of the input image for which the posture information calculated is common, according to the posture information to obtain a second virtual line, which is a virtual line on an output image to calculate a corresponding second virtual line corresponding to each pixel of the output image to obtain posture information on a basis of the corresponding second virtual line;
an image deformation unit that uses the posture information associated by the posture association unit to calculate, for the coordinates of each pixel of the output image, reference coordinates on the input image corresponding to the coordinates of each pixel;
a reference pixel acquisition unit that reads reference pixel data from a storage unit that stores pixel data of the input image on a basis of the reference coordinates for the coordinates of each pixel of the output image; and
an interpolation unit that performs interpolation processing using the reference pixel data to generate pixel data included in the output image.

15. A signal processing method comprising, by a signal processing device,
posture calculation processing of calculating posture information corresponding to a line of an input image,
posture association processing of rotating a first virtual line, which is a virtual line in a line direction of the input image for which the posture information calculated is common, according to the posture information to obtain a second virtual line, which is a virtual line on an output image to calculate a corresponding second virtual line corresponding to each pixel of the output image to obtain posture information on a basis of the corresponding second virtual line, and
conversion processing of using the posture information associated by the posture association processing to calculate, for coordinates of each pixel of the output image, reference coordinates on the input image corresponding to the coordinates of each pixel.

* * * * *